United States Patent
Toriyama

(10) Patent No.: US 8,842,305 B2
(45) Date of Patent: Sep. 23, 2014

(54) IMAGE PROCESSING DEVICE, DISPLAY DEVICE AND NON-TRANSITORY COMPUTER READABLE RECORDING MEDIUM

(71) Applicant: Konica Minolta, Inc., Chiyoda-ku (JP)

(72) Inventor: Hideyuki Toriyama, Toyokawa (JP)

(73) Assignee: Konica Minolta, Inc., Chiyoda-Ku, Tokyo (JP)

( * ) Notice: Subject to any disclaimer, the term of this patent is extended or adjusted under 35 U.S.C. 154(b) by 0 days.

(21) Appl. No.: 13/950,925

(22) Filed: Jul. 25, 2013

(65) Prior Publication Data

US 2014/0029034 A1    Jan. 30, 2014

(30) Foreign Application Priority Data

Jul. 30, 2012    (JP) .................................. 2012-168047

(51) Int. Cl.
| | | |
|---|---|---|
| *G06F 15/00* | (2006.01) | |
| *G06K 1/00* | (2006.01) | |
| *H04N 1/00* | (2006.01) | |
| *G06F 3/0481* | (2013.01) | |

(52) U.S. Cl.
CPC .......... *G06F 3/0481* (2013.01); *H04N 1/00413* (2013.01)
USPC .......................................... 358/1.13; 358/1.1

(58) Field of Classification Search
CPC ........................... G06F 3/0481; H04N 1/00413
USPC ................. 358/1.13, 1.1, 1.15, 1.14
See application file for complete search history.

(56) References Cited

U.S. PATENT DOCUMENTS

| | | | |
|---|---|---|---|
| 8,560,947 B2 * | 10/2013 | Gillespie et al. ............... | 715/702 |
| 2007/0216973 A1 | 9/2007 | Tagawa | |
| 2008/0186285 A1 | 8/2008 | Shimizu | |
| 2008/0231914 A1 | 9/2008 | Motoyoshi | |
| 2012/0008176 A1 | 1/2012 | Ishida | |

FOREIGN PATENT DOCUMENTS

| | | |
|---|---|---|
| JP | 2000-215322 A | 8/2000 |
| JP | 2003-125125 A | 4/2003 |
| JP | 2007-280369 A | 10/2007 |
| JP | 2008-191799 A | 8/2008 |
| JP | 2008-236539 A | 10/2008 |
| JP | 2009-230632 A | 10/2009 |
| JP | 2012-023462 A | 2/2012 |

* cited by examiner

*Primary Examiner* — Douglas Tran
(74) *Attorney, Agent, or Firm* — Buchanan Ingersoll & Rooney PC

(57) ABSTRACT

An image processing device, comprises: a display part on which a variety of information is displayed; an image processing part for performing a plurality of image processing sequentially to process an input image data; a thumbnail image generating part for generating a thumbnail image one after the other based on the input image data or the processed image data generated sequentially in response to each image processing performed by the image processing part; an image outputting part for outputting an image based on the image data which is processed through the entire plurality of image processing; a display controlling part for displaying a processing path of the plurality of image processing performed sequentially by the image processing part from the image data is input until the image is output on the display part, and for displaying the thumbnail image along the processing path.

20 Claims, 19 Drawing Sheets

IMAGE PROCESSING DEVICE, DISPLAY DEVICE AND NON-TRANSITORY COMPUTER READABLE RECORDING MEDIUM

This application is based on the application No. 2012-168047 filed in Japan, the contents of which are hereby incorporated by reference.

BACKGROUND OF THE INVENTION

1. Field of the Invention

The present invention relates to an image processing device, a display device and a non-transitory computer readable recording medium.

2. Description of the Background Art

For executing jobs, image processing devices such as MFPs perform a series of operations. The series of operations include an operation to perform a plurality of image processing set in advance to process input image data sequentially, to generate image data for output, and to output the generated image data for output. For a fax transmission job, for instance, the image processing device performs the plurality of image processing sequentially to process image data generated by reading a document by a scanner section and generates fax transmittable image data. The image processing device then sends the generated image data as fax data. The way of outputting the image data is not always fax transmission. For a copy job, the image data is produced as the printed output. For a scan job, the image data is sent to another device over a network, or is stored in a storage region called as box (BOX) in a hard disk device installed on the image processing device.

This type of conventional image processing devices are capable of editing the image data generated by executing the jobs after execution of the jobs. This known technique is introduced for example in Japanese Patent Application Laid-Open No. JP 2009-230632 A (hereafter, document 1) and Japanese Patent Application Laid-Open No. JP 2008-236539 A (hereafter, document 2).

It is assumed that there is a document including multiple pages, each of which having images printed on both sides, and a scan job for each side of the page of the document is executed. According to the known technique disclosed in document 1, after two scan jobs per each side of a page are executed, a group of odd pages and a group of even pages generated in response to two scan jobs are rearranged with simple operation. As a result, a document, file containing the image data of the first page to the last page in order of front to back is allowed to be created.

According to the known technique disclosed in document 2, a list of read images generated by a scan job is displayed on an operational panel which is operable by a user by touching its screen after execution of the scan job, and an edit icon is displayed next to the list. When the user drags the read image of the list on the edit icon, an edit processing corresponding to the edit icon to process the read image selected by the user is started.

According to the known techniques disclosed in the respective documents 1 and 2, image data as intended by a user is processed or edited in response to an edit operation by the user after execution of the scan job is complete.

Users sometimes notice that settings of image processing are configured not as intended after he or she gives an instruction on job execution to the image processing device and before the job is complete. It is assumed, for example, the user would like to have copied outputs in full color by making the image processing device read a colored document including multiple pages. By checking the first page actually output by the image processing device, the user notices that color settings for image processing is configured not as intended before the whole pages are produced as printed outputs if the first page is printed in black and white. Even before the processing to produce the printed output of the first page is started, the user may notice that he or she forgot to change the color settings to full color from black and white soon after he or she gives the instruction to execute the job or before giving the instruction.

In such cases, according to the above-described known techniques, the settings of each image processing performed during execution of the job are not allowed to be changed in the middle of the process. For the conventional image processing devices, the user cancels the job to terminate in the middle of the execution. The user then appropriately configures again the settings of the image processing or the settings of the way to output as intended. After that, the user is necessary to give the instruction on execution of the job again. When canceling the execution of the job in the middle of the process, reading operation for almost all pages of the document including multiple pages may be completed of cancellation of the job, for instance. In this case, the image data already generated by reading the document would be wasted. Also for the user, he or she has to place again the document already read once on the scanner section when again giving the instruction on execution of the job, resulting in poor operation efficiency.

Its very much a situation in which the user notices that the settings of the image processing or the setting for the way to output for executing the job are configured not as intended after the job is complete on the image processing device. Also in this case, the user configures again appropriately the settings of the image processing as intended. After that, the user is necessary to give the instruction on execution of the job again. It is supposed that the reason why the user cannot notice a mistake on the settings before completion of execution of the job is that the conventional image processing devices are not capable of allowing the user to see what processing on the image data is performed during execution of the job on a real-time basis. The conventional image processing devices are not capable of showing how the image data changes in response to the series of the image processing performed during execution of the job to the user on the real-time basis. Therefore, the user often notices that the settings of the image processing are not configured as intended by checking the output image after the execution of the job is complete. The execution of the job would be wasted.

In order to avoid the cases where execution of the job would be wasted, how the image data changes in response to the plurality of the image processing performed after execution of the job is started until the processing to output the image is started on the image processing device, for example, is displayed sequentially on a viewing area of an operational panel of the image processing device to allow the user to see the change in the image brought during execution of the job. To be more specific, the user sees the image changing during execution of the job, thereby being allowed to temporarily suspend execution of the job at the time he or she notices that unintended change in the image is brought and to restart execution of the job after making change in the settings of the image processing.

The recent image processing devices realize the high-speed processing for each image processing performed during execution of the job, and allow the processing before starting the image output to be complete in a shorter time. Even when how the image data has changed in response to each image processing is displayed sequentially before the image output is started, a continuous displaying time to display each image becomes short so that the user is not allowed to fully check the detail of each image. For displaying the change in the image brought during execution of the job to allow the user to check the change, it is required for the user to fully check how the image data has changed in response to the image processing of the plurality of the image processing especially the one of interest to the user, for example, or how the current image data has changed in response to the image processing the settings of which are often changed by the user.

SUMMARY OF THE INVENTION

The present invention is intended to solve the above problems. Thus, the present invention is intended to provide an image processing device, a display device and a non-transitory computer readable recording medium capable of allowing a user to check how an image changes in response to image processing performed during execution of a job, and setting a continuous displaying time of each image based on the user's intention to display the image that changes during execution of the job, thereby allowing the user to fully check the change in the image especially the one that he or she would like to check.

First, the present invention is directed to an image processing device.

According to an aspect of the image processing device, the image processing device, comprises: a display part on which a variety of information is displayed; a manipulation detecting part for detecting an operation on the display part; an image inputting part for inputting image data; an image processing part for performing a plurality of image processing sequentially to process the image data input by the image inputting part; a thumbnail image generating part for generating a thumbnail image one after the other based on the image data input by the image inputting part or the processed image data generated sequentially in response to each image processing performed by the image processing part; an image outputting part for outputting an image based on the image data which is processed through the entire plurality of image processing by the image processing part; a display controlling part for displaying a processing path of the plurality of image processing performed sequentially by the image processing part from the image data is input by the image inputting part until the image is output by the image outputting part on the display part, and for displaying the thumbnail image generated one after the other by the thumbnail image generating part with updating the thumbnail image along the processing path, thereby displaying a process result of each image processing performed by the image processing part; and a continuous displaying time setting part for setting a value of a continuous displaying time between updates of each thumbnail image displayed in the processing path by the display controlling part based on the operation detected by the manipulation detecting part or past operation records. The display controlling part updates the thumbnail image in accordance with the value of the continuous displaying time set by the continuous displaying time setting part.

Second, the present invention is directed to a display device capable of displaying in cooperation with an image processing device capable of performing a variety of image processing to process image data.

According to an aspect of the display device, the image processing device includes: an image inputting part for inputting the image data; an image processing part for performing the plurality of image processing sequentially to process the image data input by the image inputting part; a thumbnail image generating part for generating a thumbnail image one after the other based on the image data input by the image inputting part or the processed image data generated sequentially in response to each image processing performed by the image processing part; an image outputting part for outputting an image based on the image data which is processed through the entire plurality of image processing by the image processing part; and a controlling part for setting each image processing performed by the image processing part. The display device includes: a display part on which a variety of information is displayed; a manipulation detecting part for detecting an operation on the display part; a display controlling part for displaying a processing path of the plurality of image processing performed sequentially by the image processing part from the image data is input by the image inputting part until the image is output by the image outputting part on the display part, and for displaying the thumbnail image generated one after the other by the thumbnail image generating part with updating the thumbnail image along the processing path, thereby displaying a process result of each image processing performed by the image processing part; and a continuous displaying time setting part for setting a value of a continuous displaying time between updates of each thumbnail image displayed in the processing path by the display controlling part based on the operation detected by the manipulation detecting part or past operation records. The display controlling part updates the thumbnail image in accordance with the value of the continuous displaying time set by the continuous displaying time setting part.

Third, the present invention is directed to a non-transitory computer readable recording medium on which a program is recorded. The program is executable on a display device including a display part on which a variety of information is displayed and a manipulation detecting part for detecting an operation on the display part. The program is executed on the display device, thereby causing the display device to display in cooperation with an image processing device capable of performing a variety of image processing to process image data.

According to an aspect of the non-transitory computer readable recording medium, the image processing device includes: an image inputting part for inputting the image data; an image processing part for performing the plurality of image processing sequentially to process the image data input by the image inputting part; a thumbnail image generating part for generating a thumbnail image one after the other based on the image data input by the image inputting part or the processed image data generated sequentially in response to each image processing performed by the image processing part; an image outputting part for outputting an image based on the image data which is processed through the entire plurality of image processing by the image processing part; and a controlling part for setting each image processing performed by the image processing part. The program executed on the display device to function as a system comprises: a display controlling part for displaying a processing path of the plurality of image processing performed sequentially by the image processing part from the image data is input by the image inputting part until the image is output by the image outputting part on the display part, and for displaying the thumbnail image generated one after the other by the thumbnail image generating part with updating the thumbnail image along the processing path, thereby displaying a process result of each image processing performed by the image processing part; and a continuous displaying time setting part for setting a value of a continuous displaying time between updates of each thumbnail image displayed in the processing path by the display controlling part based on the operation detected by the manipulation detecting part or past operation records. The display controlling part updates the thumbnail image in accordance with the value of the continuous displaying time set by the continuous displaying time setting part.

DESCRIPTION OF THE PRESENT PREFERRED EMBODIMENTS

Figure 1:
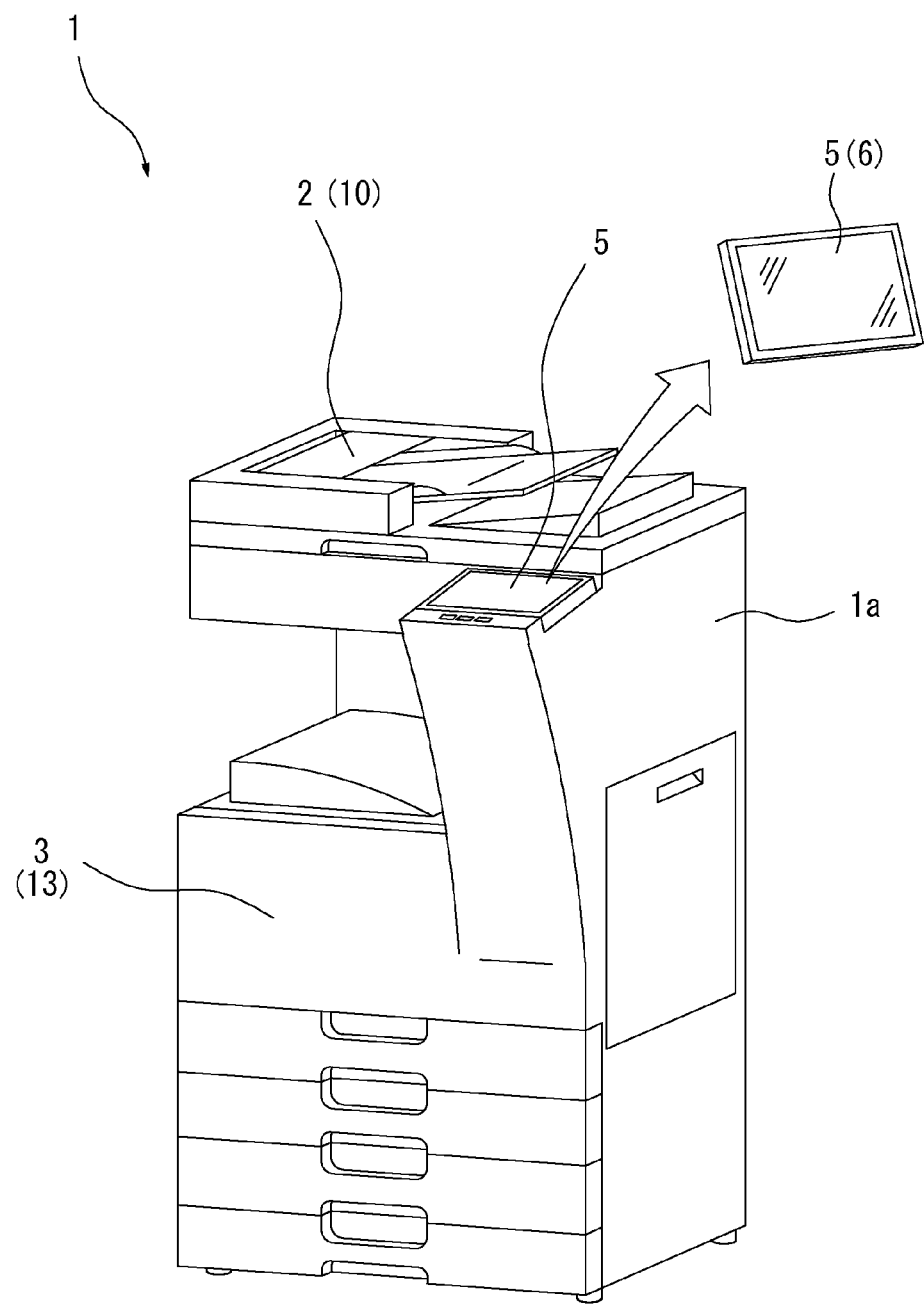
FIG. 1 shows an exemplary configuration of an image processing device.

Preferred embodiments of the present invention are described in detail below with reference to figures. In the description given below, those elements which are shared in common among figures are represented by the same reference numerals, and these elements are not discussed repeatedly for the same description.

(First Preferred Embodiment)

FIG. 1 shows an exemplary configuration of an image processing device I of the first preferred embodiment. The image processing device 1 is formed from a device such as one of MFPs capable of executing a variety of jobs including copy jobs, print jobs, scan jobs and fax jobs.

A device body 1a of the image processing device 1 includes a scanner section 2 and a printer section 3. The scanner section 2 is driven to read a document and generate image data thereof. The printer section 3 is driven to produce a printed output by forming an image on a sheet such as a printing sheet. The device body 1a is provided with an operational panel 5, a user interface operable by a user in use of the image processing device 1, on its front side. The operational panel 5 can be attached and removed from the device body 1a. For using the operational panel 5 by removing from the device body 1a, the operational panel 5 serves as a portable display device 6 such as a tablet terminal. The operational panel 5 establishes wired or radio communication with the device body 1a, thereby displaying a variety of operation screen images and notifying the device body 1a of an operation by the user after detecting the operation.

Figure 2:
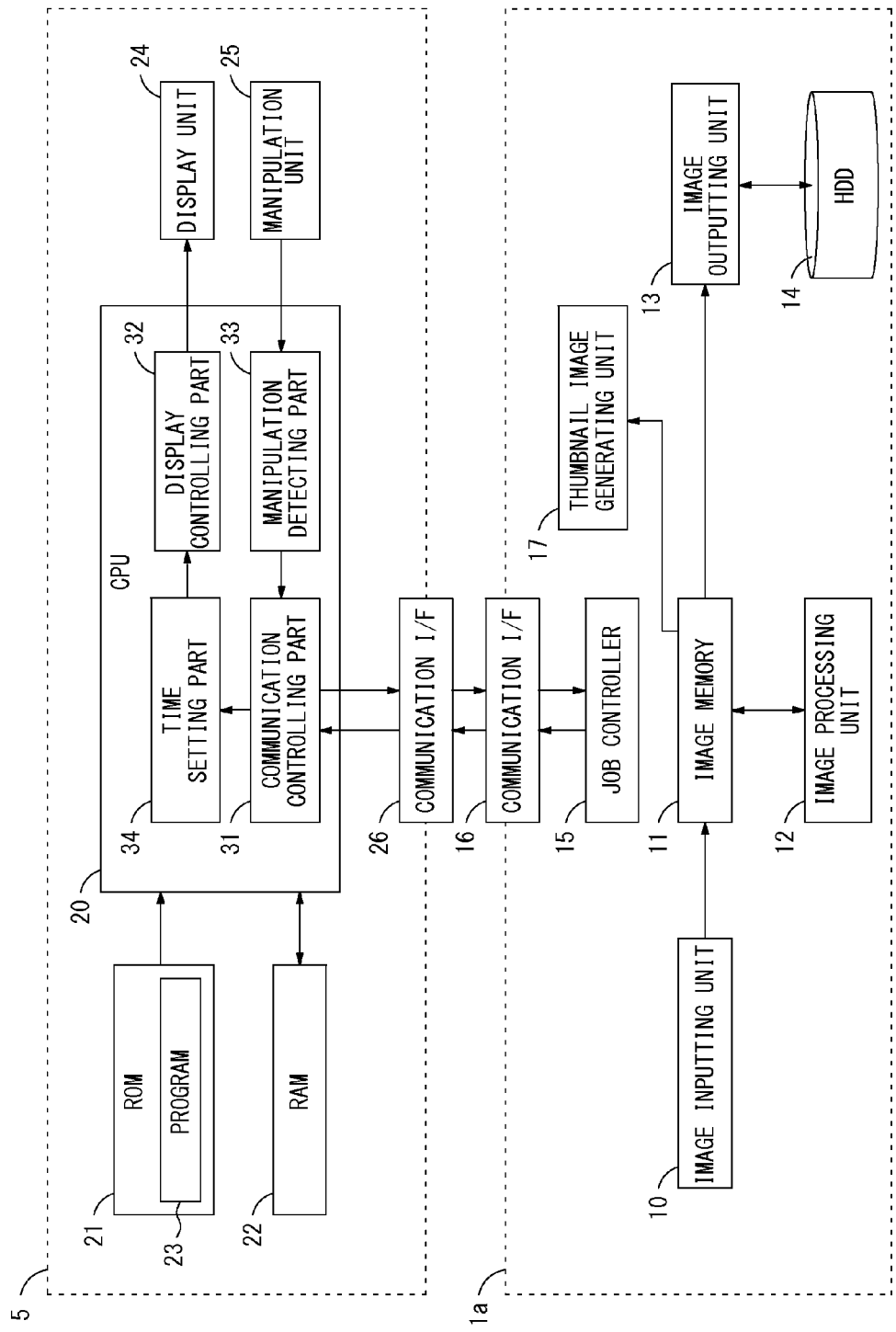
FIG. 2 is a block diagram showing an exemplary hardware configuration of the image processing device.

FIG. 2 is a block diagram showing an exemplary hardware configuration of the image processing device 1. As illustrated in FIG. 2, the device body 1a of the image processing device 1 includes an image inputting unit 10, an image memory 11, an image processing unit 12, an image outputting unit 13, a hard disk device 14, a job controller 15, a communication interface 16 and a thumbnail image generating unit 17. Each unit is brought into operation on the device body 1a so that the image processing device 1 is allowed to execute the various types of jobs including copy jobs, print jobs, scan jobs and fax jobs.

The image inputting unit 10 obtains image data to be a target of execution of the job. The image inputting unit 10 includes the aforementioned scanner section 2 that obtains the image data to be the target of execution of the job by reading a document. The image processing device 1 is also capable of obtaining the image data to be the target of execution of the job over a network such as LAN, or obtaining the image data to be the target of execution of the job by receiving fax data. Processing parts including a network interface and a fax receiving part not shown in figures also serve as a part of the image inputting unit 10. In response to obtaining the image data to be the target of execution of the job after starting execution of the job, the image inputting unit 10 stores the obtained image data in the image memory 11. The image data obtained by the image inputting unit 10 as the target of execution of the job may be the image data of a single page or the image data of multiple pages.

The image memory 11 includes a storage region in which the image data of the multiple pages may be stored. After the image data to be the target of execution of the job is stored in the image memory 11, the image processing unit 12 is brought into operation.

The image processing unit 12 performs a plurality of the image processing set in advance sequentially to process the image data obtained by the image inputting unit 10, thereby generating image data to output. The image processing unit 12 reads the image data stored in the image memory 11 and performs the plurality of image processing sequentially, thereby storing processed image data in the image memory 11 as described later.

The image outputting unit 13 reads the processed image data and outputs an image after the entire image processing to process the image data is performed by the image processing unit 12. The aforementioned printer section 3 produces the printed output based on the image data processed through the plurality of image processing, which is one of the ways to output. The printer section 3 is a part of the image outputting unit 13. Besides producing the image data as the printed output, the image processing device 1 is capable of outputting the image data to an external device over the network such as LAN, or outputting the image by sending the fax data. The processing parts including the network interface and the fax receiving part not shown in figures also serve as a part of the image outputting unit 13. The image outputting unit 13 is also capable of outputting the image data to the hard disk device 14.

The thumbnail image generating unit 17 reads the image data obtained by the image inputting unit 10 and the processed image data generated one after the other by the image processing unit 12 in the image memory 11, and generates the thumbnail image corresponding to the read image data. The thumbnail image generating unit 17 thins out pixels to read the image data stored in the image memory 11 and generates the thumbnail image corresponding to the image data.

The hard disk device 14 stores therein the image data output by the image outputting unit 13 or other data. The hard disk device 14 also stores therein records information 19 (see FIG. 10) explained later, for example, and serves as a records information storage part.

The job controller 15 controls each operation of the image inputting unit 10, the image processing unit 12, the image outputting unit 13 and the thumbnail image generating unit 17, thereby controlling overall process of execution of the job on the image processing device 1. In response to starting execution of the job, the job controller 15 gives an instruction on the image processing that should be performed to the image processing unit 12 based on the job type or the settings configured in advance by the user. The job controller 15 also sets information such as a parameter applied for execution of each image processing. The job controller 15 gives an instruction on the way how the image is output to the image outputting unit 13 based on the job type or the settings configured in advance by the user. After starting execution of the job, the job controller 15 causes the image inputting unit 10, the image processing unit 12 and the image outputting unit 13 to perform the necessary operations, respectively, thereby controlling a series of the operations performed for execution of the job.

In response to receiving operation information specifying to change the settings of the image processing, for instance, from the operational panel 5 during execution of the job, the job controller 15 changes the settings of the image processing performed by the image processing unit 12 at the time of receipt of the operation information. The job controller 15 temporarily suspends the job execution operation if necessary, and changes the settings of the image processing. After that, the job controller 15 restarts execution of the job.

Figure 3:
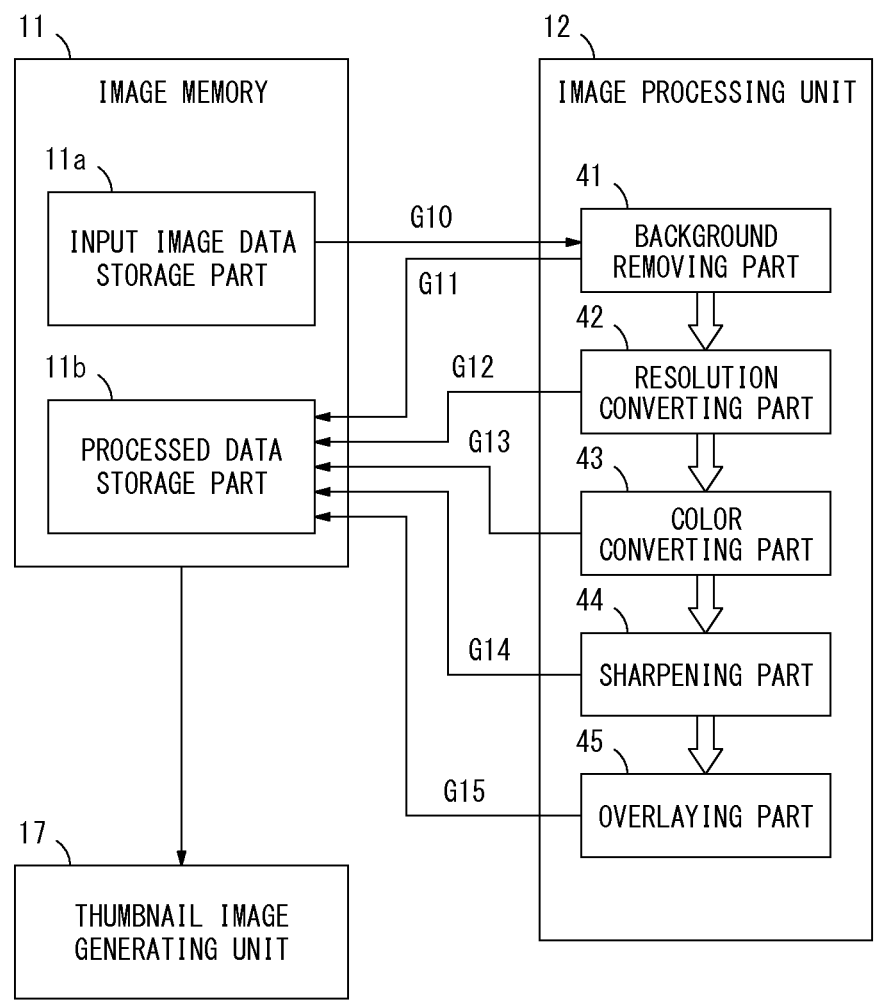
FIG. 3 is a block diagram showing an exemplary configuration of an image memory, an image processing unit and a thumbnail image generating unit.

FIG. 3 is a block diagram showing an exemplary configuration of the image memory 11, the image processing unit 12 and the thumbnail image generating unit 17. As shown in FIG. 3, the image memory 11 includes an input image data storage part 11a and a processed data storage part 11b. The image data obtained by the image inputting unit 10 is stored in the input image data storage part 11a. The image data stored in the input image data storing part 11a remains original data (initial data) until execution of the job is complete without being updated.

The image processing unit 12 sequentially reads the image data stored in the input image data storage part 11a of the image memory 11 and performs the plurality of image processing one by one in accordance with a processing process set in advance by the job controller 15. In the example of FIG. 3, the image processing unit 12 includes a background removing part 41, a resolution converting part 42, a color converting part 43, a sharpening part 44 and an overlaying part 45. The image processing unit 12 brings each part into operation sequentially, thereby performing the corresponding image processing one by one. The example of FIG. 3 is only one of examples, and the image processing performed by the image processing unit 12 may include ones not shown in FIG. 3.

The background removing part 41 is brought into operation on the image processing unit 12 at first. The background removing part 41 reads image data G10 stored in the input image data storage part 11a to adjust a predetermined color such as white on the background of the image. The background removing part 41 stores image data G11 generated in response to the background removal in the processed data storage part 11b.

The resolution converting part 42 is brought into operation on the image processing unit 12 at second. The resolution converting part 42 reads the image data G11 generated in response to the background removal in the processed data storage part 11b to convert resolution. The resolution converting part 42 stores image data. G12 generated in response to the resolution conversion in the processed data storage part 11b.

The color converting part 43 is brought into operation on the image processing unit 12 at third. The color converting part 43 reads the image data G12 generated in response to the resolution conversion in the processed data storage part 11b to convert colors. The color converting part 43 stores image data G13 generated in response to the color conversion in the processed data storage part 11b.

The sharpening part 44 is brought into operation on the image processing unit 12 at forth. The color converting part 43 reads the image data G13 generated in response to the color conversion in the processed data storage part 11b to enhance the edges, results in sharp transitions and detail with clearly defined borders. The sharpening part 44 stores image data G14 generated in response to the sharpness in the processed data storage part 11b.

The overlaying part 45 is brought into operation on the image processing unit 12 at last. The overlaying part 45 reads the image data G14 generated in response to the sharpness in the processed data storage part 11b to superimpose a predetermined image on the read image data G14, thereby performing overlaying process. The overlaying part 45 stores image data G15 generated in response to the overlaying process in the processed data storage part 11b.

The image processing unit 12 performs the plurality of image processing set in advance before execution of the job one after the other, thereby processing the image data G10, the target of execution of the job sequentially and generating the image data G15 to be the target of output eventually.

All of the plurality of processed image data. G11, G12, G13, G14 and G15 generated as described above may be stored in the processed data storage part 11b of the image memory 11 until execution of the job is complete. The image data is not always stored in the processed data storage part 11b until execution of the job is complete. The plurality of processed image data G11, G12, G13, G14 and G15 may be discarded from the processed data storage part 11b at the time when neither of which is necessary any more.

As the image data G10 to be the target of execution of the job is stored in the input image data storage part 11a of the image memory 11, the thumbnail image generating unit 17 reads the image data G10 and generates the thumbnail image corresponding to the read image data G10. The thumbnail image generating part 17 reads the processed image data in the processed data storage part 11b to generate the thumbnail image every time each of the processed image data G11, G12, G13, G14 and G15 is stored in the processed data storage part 11b one after the other.

Figure 4:
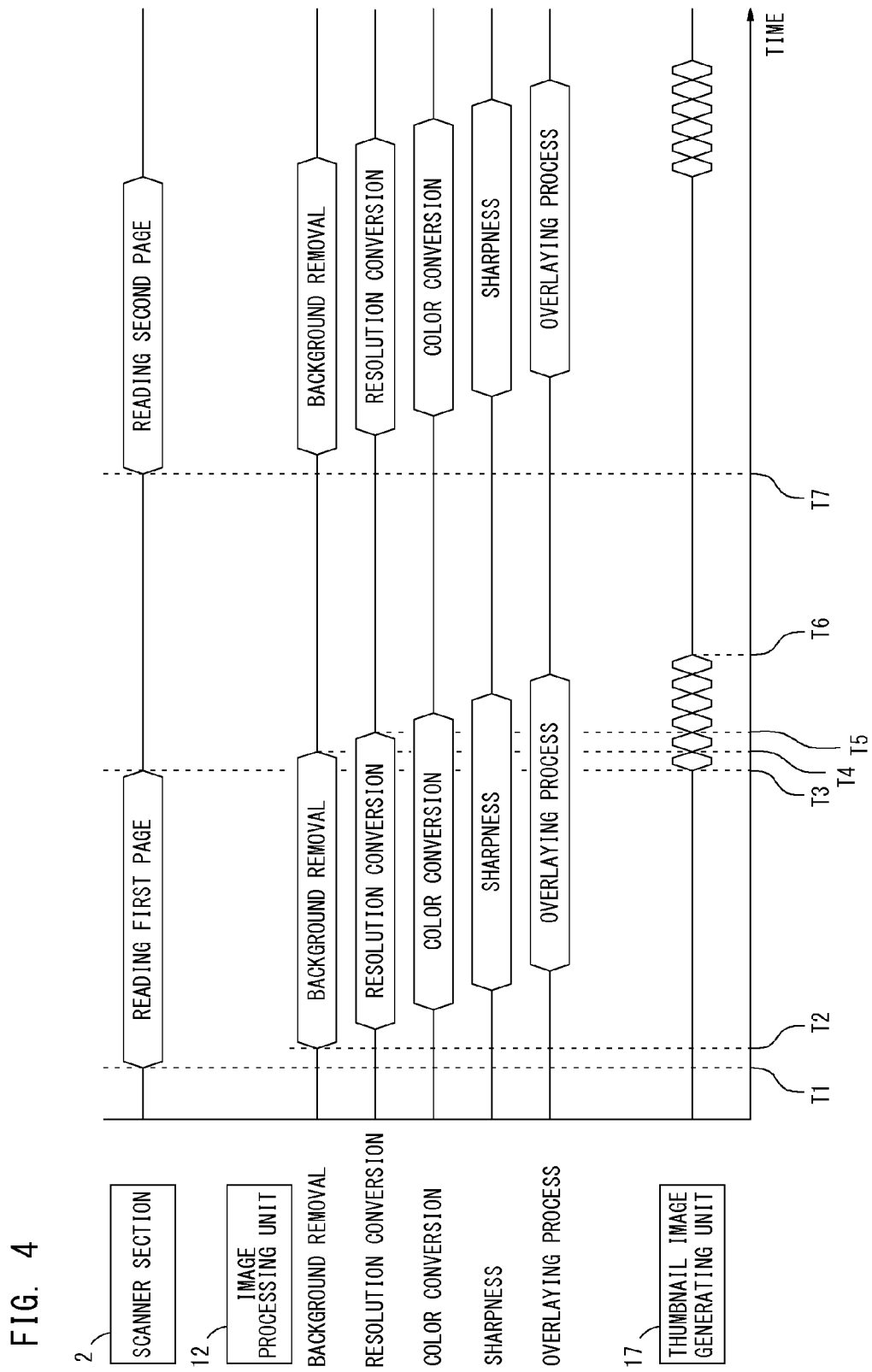
FIG. 4 is an exemplary timing chart showing an overview of a processing performed when each processing part of the image processing unit is formed from the hardware.

When each processing part, the background removing part 41, the resolution converting part 42, the color converting part 43, the sharpening part 44 and the overlaying part 45, of the image processing unit 12 is formed from the hardware, for instance, the image processing unit 12 is capable of performing each image processing at high speed. FIG. 4 is an exemplary timing chart showing an overview of a processing performed when each processing part of the image processing unit 12 is formed from the hardware. In the example of FIG. 4, for instance, the scanner section 2 is driven to read pages of the document including multiple pages one by one and to generate the image data G10 corresponding to the image data of a single page to be the target of execution of the job. After the scanner section 2 starts reading a first page of the document at time T1, its reading head reads lines of the document one by one along a main-scanning direction and stores the image data G10 corresponding to the image data of each line in the image memory 11.

Each processing part, 41, 42, 43, 44 and 45, of the image processing unit 12 may be formed from the hardware. In this case, the processing is allowed to be started after at least the image data of one line to be the target of the processing is stored in the image memory 11. After the scanner section 2 starts reading the first page, the background removing part 41 starts the background removal at time T2 at least the image data of the line is stored in the input image data storage part 11a of the image memory 11. The background removing part 41 carries out the background removal in parallel with the reading operation of the document by the scanner section 2. The scanner section 2 completes reading the last line, and the image data G10 corresponding to the image data of the whole page is stored in the image memory 11 at time T3. The background removing part 41 then completes the background removal for the whole page at time T4, a little behind the time T3.

The resolution converting part 42 reads the image data G11 at the time the image data G11 of at least the line generated in response to the background removal is stored in the processed data storage part 11b by the background removing part 41. The resolution converting part 42 then starts resolution conversion. The resolution converting part 42 completes the resolution conversion for the whole page at time T5, a little behind time T4 at which the processed image data G11 corresponding to the image data of the whole page is stored in the image memory 11 by the background removing part 41.

The processing for the color converting part 43, the sharpening part 44 and the overlaying part 45 is the same as the above-described ones. Each processing part starts the corresponding image processing at the time when at least the image data of the line is stored in the processed data storage part 11b by the processing part placed at its upper side. Each processing part completes the image processing for the whole page at the time, a little behind the time at which the processed image data corresponding to the image data of the whole page is stored in the image memory 11 by the processing part placed at its upper side.

As the image data. G10 of the whole page is stored in the input image data storage part 11a by the scanner section 2, the thumbnail image generating unit 17 reads the image data G10 at the time T3 and generates the thumbnail image corresponding to the read image data G10. The thumbnail image generating unit 17 generates the thumbnail image corresponding to each of the image data one after the other at the time when the processed image data G11, G12, G13, G14 and G15 is stored in the image memory 11 after the processing by each processing part, the background removing part 41, the resolution converting part 42, the color converting part 43, the sharpening part 44 and the overlaying part 45, is complete.

The image processing unit 12 formed from the hardware is capable of completing the entire plurality of image processing before the scanner section 2 starts reading the second page of the document after completing reading the first page of the document. The thumbnail image generating unit 17 is allowed to generate the thumbnail image corresponding to the image data G10 obtained by reading the document by the scanner section 2 and the thumbnail images each of which corresponding to the image data G11, G12, G13, G14 and G15 generated in response each of the plurality of image processing before the scanner section 2 starts reading the second page of the document.

In the example of FIG. 4, the image processing is started by the image processing unit 12 at the time at least the image data G10 of the line is stored in the image memory 11 by the scanner section 2. The image processing is not always started by the image processing unit 12 at the time. The image processing unit 12 may start the image processing at the time when the scanner section 2 stores the image data G10 of the whole page in the image memory 11, for example. Even in such a case, the image processing unit 12 formed from the hardware is capable of completing the entire image processing in few microseconds. As a result, the image processing unit 12 is allowed to complete the entire plurality of image processing set in advance before the scanner section 2 starts reading the second page of the document.

The job controller 15 controls the above-explained series of operations, thereby controlling the image processing performed on the image processing device 1 during execution of the job.

The job controller 15 establishes communication with the operational panel 5 via the communication interface 16. The communication interface 16 establishes wired or radio communication. In response to starting execution of the job, the job controller 15 sends process detail of the processing performed by each of the image inputting unit 10, the image processing unit 12 and the image outputting unit 13 to the operational panel 5 via the communication interface 16. After the thumbnail image is generated by the thumbnail image generating part 17, the job controller 15 sends the generated thumbnail image to the operational panel 5 via the communication interface 16. In response to obtaining the operation information from the operational panel 5 during execution of the job, the job controller 15 performs the processing in accordance with the operation information. More specifically, for example, the job controller 15 temporarily suspends the job execution operation, changes the settings of the image processing performed during execution of the job or changes the way to output the image in accordance with the operation information received from the operational panel 5.

As illustrated in FIG. 2, the operational panel 5 includes a CPU 20, a ROM 21, a RAM 22, a display unit 24, a manipulation unit 25 and a communication interface 26. The CPU 20 is a computation unit that reads and executes a program 23 stored in advance in the ROM 21. The ROM 21 is formed from a nonvolatile memory, in which a variety of data besides the above-described program 23 is stored in advance. The RAM 22 stores therein data such as temporary data required in accordance with execution of the program 23 by the CPU 20. The RAM 22 also temporarily stores therein data such as the thumbnail image received from the device body 1a, for instance. The display unit 24 on which various types of information are displayed to the user is formed from a device such as a color liquid crystal display, for example. The manipulation unit 25 receives entries of a variety of instructions by the user. The manipulation unit 25 is formed with parts such as touch panel sensors arranged on a screen of the display unit 24, for example. The communication interface 26 is an interface to establish wired or radio communication with the device body 1a.

With execution of the program 23, the CPU 20 of the operational panel 5 serves as a communication controlling part 31, a display controlling part 32, a manipulation detecting part 33 and a time setting part 34. The communication controlling part 31 outputs information received from the device body 1a via the communication interface 26 to the display controlling part 32 or to the time setting part 34, and sends the operation information received from the manipulation detecting part 33 to the communication interface 26 to send the information to the device body 1a.

The display controlling part 32 controls a screen image displayed on a viewing area of the display unit 24. The display controlling part 32 of the first preferred embodiment especially specifies the process detail of the processing that is performed by each of the image inputting unit 10, the image processing unit 12 and the image outputting unit 13 based on the information received from the job controller 15 when the job is executed on the image processing device 1. The display controlling part 32 displays a processing path to process the image data gone through after the image inputting unit 10 inputs the image data until when the image output by the image outputting unit 13 is complete on the viewing area of the display unit 24. To be more specific, multiple process icons each of which corresponds to the respective plurality of image processing performed by the image processing unit 12 during execution of the job are displayed on the viewing area of the display unit 24, and the multiple process icons are connected together over path lines in accordance with a process order of the image processing performed by the image processing unit 12 so that the processing path is displayed. The display controlling part 32 displays the thumbnail image received from the job controller 15 in the processing path, and controls to move the thumbnail image along the processing path with updating it. The speed of moving the thumbnail image along the displayed processing path does not necessarily correspond to the process speed on the image processing unit 12. A continuous displaying time to display each thumbnail image in the processing path is set by the time setting part 34 as described later.

The manipulation detecting part 33 detects an operation when the user makes the operation on the manipulation unit 25. The manipulation detecting part 33 detects the operation to operate the process icon displayed in the processing path as the processing path is being displayed on the viewing area of the display unit 24 by the display controlling part 32. The manipulation detecting part 33 then outputs the operation information based on the detected operation to the display controlling part 32 and the time setting part 34, and sends the operation information to the communication controlling part 31 if necessary. After inputting the operation information from the manipulation detecting part 33, the display controlling part 32 updates the screen image displayed on viewing area of the display unit 24. In response to inputting the operation information based on the operation to operate the process icon, the time setting part 34 changes an update interval to update the thumbnail image based on the operation information. In response to inputting the operation information based on the operation to operate the process icon, the communication controlling part 31 sends the operation information to the job controller 15. The operation information sent to the job controller 15 from the manipulation detecting part 33 during execution of the job contains, for example, information including a stop signal to temporarily suspend execution of the job, instruction information specifying to change the settings of the image processing or the settings of the way to output performed during execution of the job or a restart signal to restart execution of the job which is being temporarily suspended.

The time setting part 34 sets the continuous displaying time (update interval) of each thumbnail image displayed on the processing path. The time setting part 34 sets a default value for the continuous displaying time of each thumbnail image at start of execution of the job. Based on the default value, the display controlling part 32 sets the display position of each of the multiple process icons and the length of the path lines connecting the multiple process icons. The display controlling part 32 then displays the processing path on viewing area of the display unit 24. In response to receiving the operation information indicating that the display position of the process icon is changed or the operation information indicating that the display size of the process icon is changed from the manipulation detecting part 33, the time setting part 34 changes the default value for the continuous displaying time in accordance with the received operation information. As the value of the continuous displaying time is changed by the time setting part 34, the display controlling part 32 changes the continuous displaying time of each thumbnail based on the changed value of the continuous displaying time.

The screen images displayed on the viewing area of the operational panel 5 when the job is executed on the image processing device 1 with the above-described processing parts are shown, and the operation that may be made by the user in the middle of execution of the job and the processing performed by the operational panel 5 or the image processing device 1 in response to the user's operation are explained in detail next.

Figure 5:
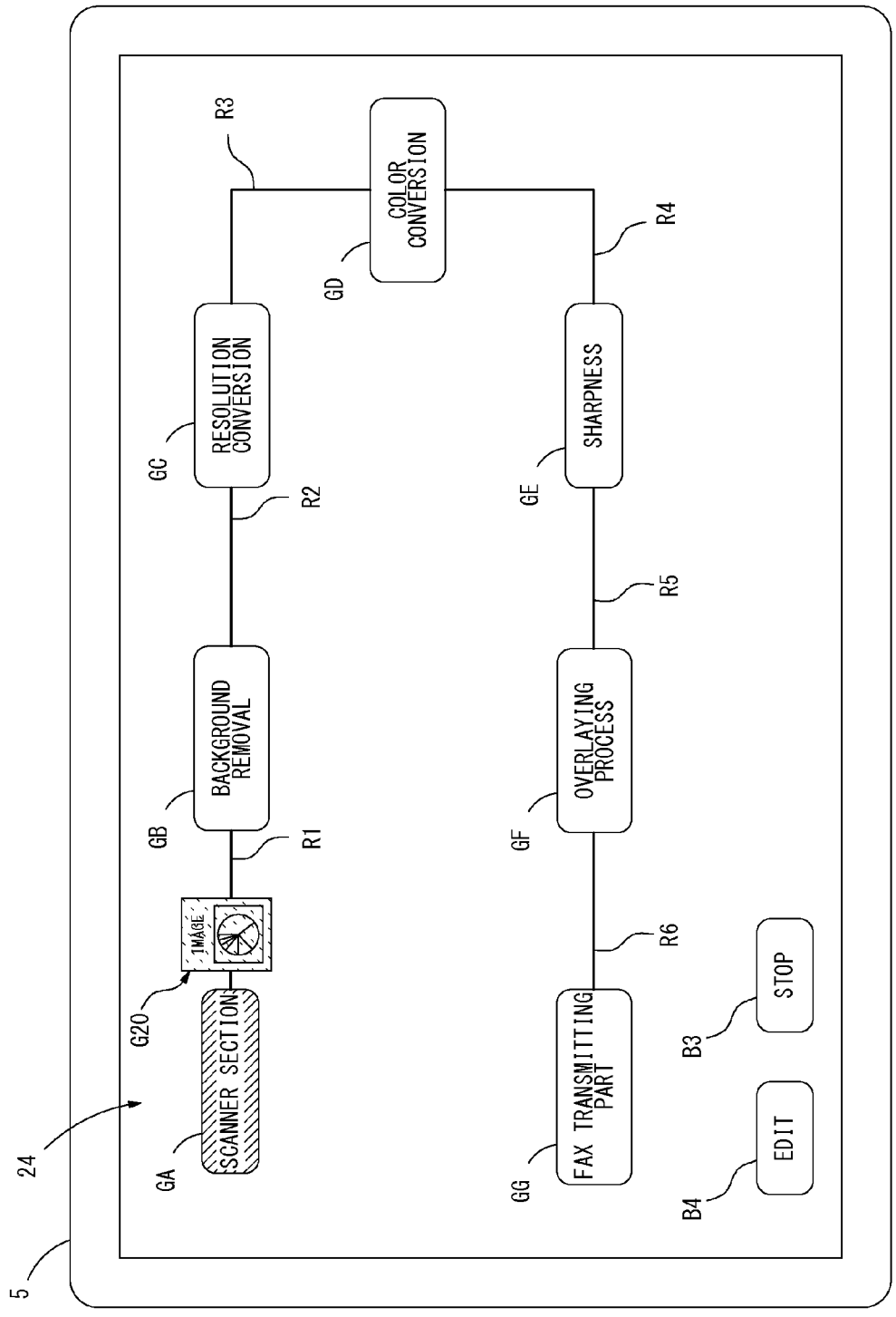
FIG. 5 is an example of a basic screen image displayed on a viewing area of an operational panel from starting execution of a job until when execution is complete on the image processing device.
Figure 6:
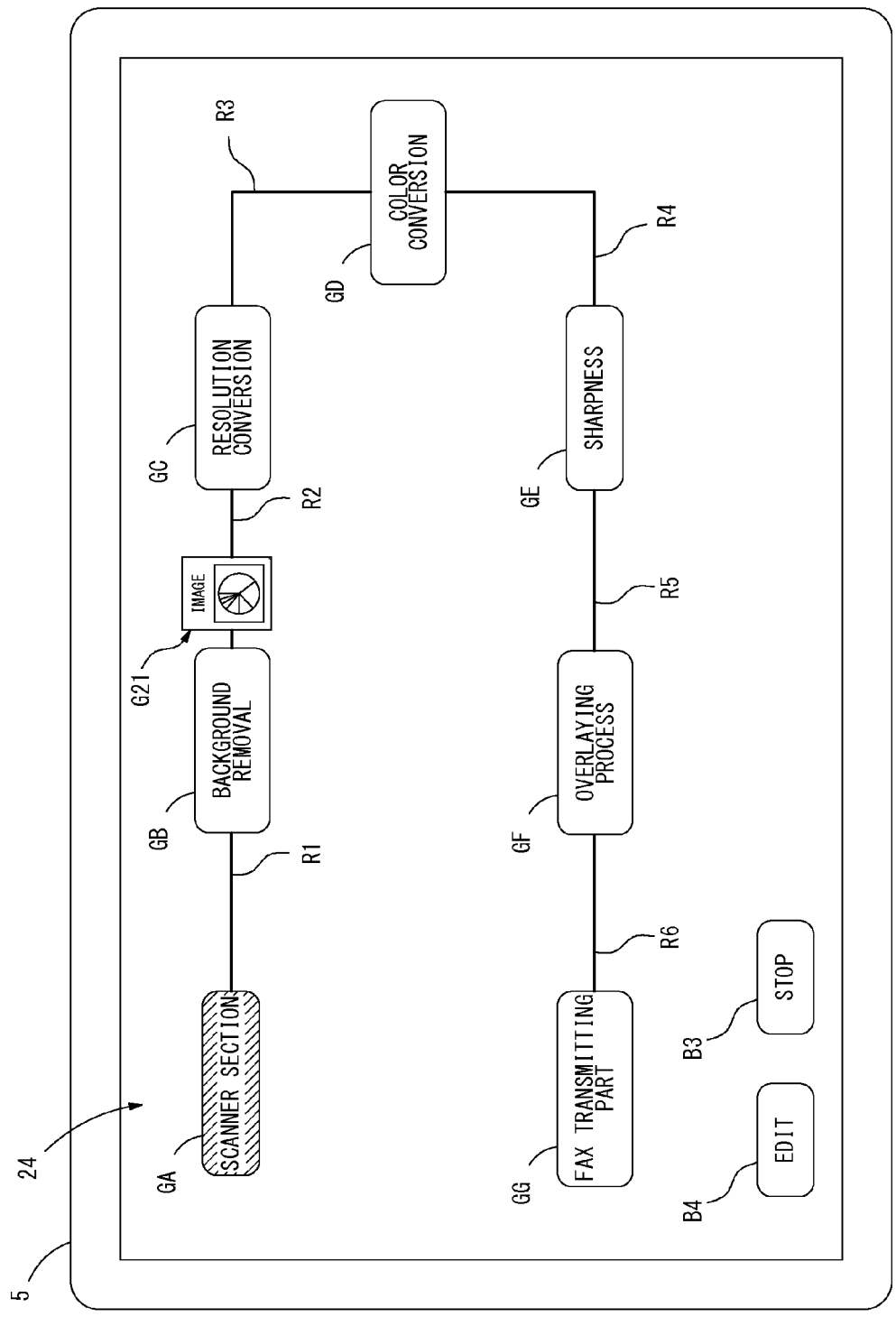
FIG. 6 is an example of a basic screen image displayed on the viewing area of the operational panel from starting execution of the job until when execution is complete on the image processing device.

FIGS. 5 and 6 are an example of basic screen images displayed on the viewing area of the operational panel 5 from starting execution of the job until when execution is complete on the image processing device 1. The example of FIGS. 5 and 6 shows the case where the job to read the document and fax transmit the data is executed.

In response to starting execution of the job, as described above, the image processing device 1 displays the processing path through which the image data goes from the time the image data, the target of execution of the job, is input to the image inputting unit 10 until when the image is output by the image outputting unit 13 on the viewing area of the display unit 24 of the operational panel 5. As shown in FIG. 5, the processing path displayed on the viewing area of the display unit 24 includes multiple process icons GA, GB, GC, GD, GE, GF and GG and multiple path lines R1, R2, R3, R4, R5 and R6 those connect the multiple process icons GA, GB, GC, GD, GE, GF and GG together in accordance with the process order. The process icon GA corresponds to the scanner section 2 that serves as the image inputting unit 10. The process icons GB, GC, GD, GE and GF correspond to the respective background removing part 41, resolution converting part 42, color converting part 43, sharpening part 44 and overlaying part 45 of the image processing unit 12. The process icon GG corresponds to the fax transmitting part serves as the image outputting unit 13. In the example of the screen image of FIG. 5, the processing path indicating that the processing to process the image data is performed in an order of the process icons GA, GB, GC, GD, GE, GF and GG is displayed.

In the example of the screen image of FIG. 5, the equal-size process icons GA, GB, GC, GD, GE, GF and GG arranged at almost equal intervals are displayed. The length of the multiple process lines R1, R2, R3, R4, R5 and R6 are almost equal. When the time setting part 34 sets the default value for the continuous displaying time of each thumbnail image at almost equal value, the processing path as illustrated in FIG. 5 is displayed.

Upon the start of execution of the job, the display controlling part 32 obtains the thumbnail image generated one after the other by the thumbnail image generating part 17. In response to obtaining the thumbnail image, the display controlling part 32 displays a thumbnail image G20 corresponding to the image data G10 which is obtained by the scanner section 2 at first in the first path line R1 as illustrated in FIG. 5. The display controlling part 32 starts measuring the continuous displaying time to display the thumbnail image G20, and continues to display the thumbnail image G20 in the path line R1 until the continuous displaying time set by the time setting part 34 elapses. Thus, the user is allowed to see how the image data G10 obtained by the scanner section 2 looks. After the continuous displaying time set by the time setting part 34 elapses, the display controlling part 32 moves the thumbnail image to the following display position in the path line R2.

FIG. 6 shows an example of the screen image when the thumbnail image is moved one step further along the processing path from the state of FIG. 5. For switching the screen image of FIG. 5 to that of FIG. 6, the display controlling part 32 updates the thumbnail image to be displayed in the following path line R2 to a thumbnail image G21 corresponding to the image data G11 generated in response to the background removal. The display controlling part 32 starts measuring the continuous displaying time to display the thumbnail image G21, and continues to display the thumbnail image G21 in the path line R2 until the continuous displaying time set by the time setting part 34 elapses. Thus, the user is allowed to see how the image data G11 generated in response to the background removal looks, or to see how the image data changes in response to the background removal. After the continuous displaying time set by the time setting part 34 elapses, the display controlling part 32 moves the thumbnail image to the following display position in the path line R3.

After that, the display controlling part 32 moves the thumbnail image to the following display position in the respective path lines R3, R4, R5 and R6 as described above. For displaying the thumbnail image in the path line R3, the display controlling part 32 updates the thumbnail image to a thumbnail image corresponding to the image data G12 generated in response to the resolution conversion. Similarly, for displaying the thumbnail image in the path line R4, the display controlling part 32 updates the thumbnail image to a thumbnail image corresponding to the image data G13 generated in response to the color conversion, and for displaying the thumbnail image in the path line R5, the display controlling part 32 updates the thumbnail image to a thumbnail image corresponding to the image data G14 generated in response to the sharpness. For displaying the thumbnail image in the path line R6 finally, the display controlling part 32 updates the thumbnail image to a thumbnail image corresponding to the image data G15 generated in response to the overlaying process.

According to the first preferred embodiment, how the image data changes in response to starting execution of the job is displayed so that the user is allowed to easily check whether or not the image processing as intended is performed during execution of the job.

As shown in FIGS. 5 and 6, a stop key B3 and an edit key B4 are shown at the bottom of the screen image. The user is allowed to operate these keys B3 and B4 by tapping.

When the user taps the stop key B3 during execution of the job, the operation information based on the operation is output to the job controller 15. The job controller 15 then temporarily suspends execution of the job. As execution of the job is being temporarily suspended, the stop key B3 changes to a restart key for restarting execution of the job.

When the edit key B4 is tapped by the user during execution of the job, the screen image displayed on the viewing area of the display unit 24 is switched to the edit screen image. So, the user is allowed to change the settings of each image processing performed by the image processing unit 12 or the settings of the way to output on the image outputting unit 13. After the user makes the operation to change the settings, the operation information based on the operation is output to the job controller 15. The job controller 15 changes the settings of each image processing performed by the image processing unit 12 or the settings of the way to output on the image outputting unit 13. Even when the user directly taps each process icon displayed in the processing path, the similar edit screen image is displayed and the operation to change the various types of settings may be made. This settings change may be made while execution of the job is temporarily suspended.

When the user notices that the image processing as intended is not carried out by viewing the thumbnail image displayed during execution of the job, he or she is allowed to change the settings of the image processing at the time he or she notices. It is assumed, for example, that every processed image data G11, G12, G13, G14 and G15 that is generated in response to the respective image processing by the image processing unit 12 is stored in the processed data storage part 11b of the image memory 11. In this case, even when the settings of a part of the plurality of image processing is changed by the user, the processing after the image processing, the settings of which is changed by the job controller 15, may be performed sequentially by reading the processed image data generated in response to the image processing which is performed before the image processing, the settings of which is changed, in the processed data storage part 11b. The process efficiency for performing again the image processing after making change in the settings specified by the user may be improved.

It is assumed that every processed image data G11, G12, G13, G14 and G15 is not stored in the image memory 11. Even in such a case, the original image data G10 obtained by the scanner section 2 is stored in the image memory 11. Each of the various types of image processing is started over again from the beginning by the image processing unit 12 after changing the settings of the image processing so that the image processing as intended by the user may be carried out. As a result, the user does not have to place again the document already read once on the scanner section 2, resulting in efficient operation.

As described above, in the first preferred embodiment, the processing path that corresponds to the plurality of image processing performed sequentially by the image processing unit 12 from the image data is input by the image inputting part 10 until the image is output by the image outputting part 13 is displayed on the viewing area of the display unit 24. The thumbnail image generated one after the other by the thumbnail image generating part 17 is displayed with being updated along the processing path, and the process result of each image processing performed by the image processing unit 12 may be displayed.

As described above, when the image processing unit 12 is formed from the hardware, for example, each image processing carried out on the image processing unit 12 completes in a short time. If the thumbnail image is moved in the processing path at the same speed as the process speed on the image processing unit 12, the continuous displaying time of each thumbnail image becomes extremely short, and the user is not allowed to fully check the detail of each thumbnail image. For setting the default value for the continuous displaying time of each thumbnail image, the time setting part 34 sets the total continuous displaying time between the time the thumbnail image is displayed in the path line R1 and the time the thumbnail image is not displayed any longer after moving to the last path line R6 at a predetermined period of time T or longer. This predetermined period of time T is preferably set at few seconds to several tens of seconds to maintain at least 1 or 2 seconds of the continuous displaying time of the thumbnail image in each path line, for example. As shown in FIGS. 5 and 6, in order to set the continuous displaying time to display the thumbnail image in each path line at almost equal value, the time setting part 34 divides the total continuous displaying time into the number of multiple path lines (N). Thus, the time setting part 34 determines the continuous displaying time of each thumbnail image as (T/N). As a result, at least 1 or 2 seconds of the continuous displaying time to display the thumbnail image updated sequentially in the processing path may be maintained so that the user is allowed to check each thumbnail image.

The time setting part 34 sets the default value for the continuous displaying time as described above. Even in this case, the user sometimes is not allowed to fully check the detail of each thumbnail image during 1 or 2 seconds of the continuous displaying time. When the user makes the operation to move the display position of the process icon displayed in the processing path or the operation to change the display size of the process icon, the time setting part 34 of the first preferred embodiment changes the value set as the continuous displaying time of each thumbnail image based on the operation.

Figure 7:
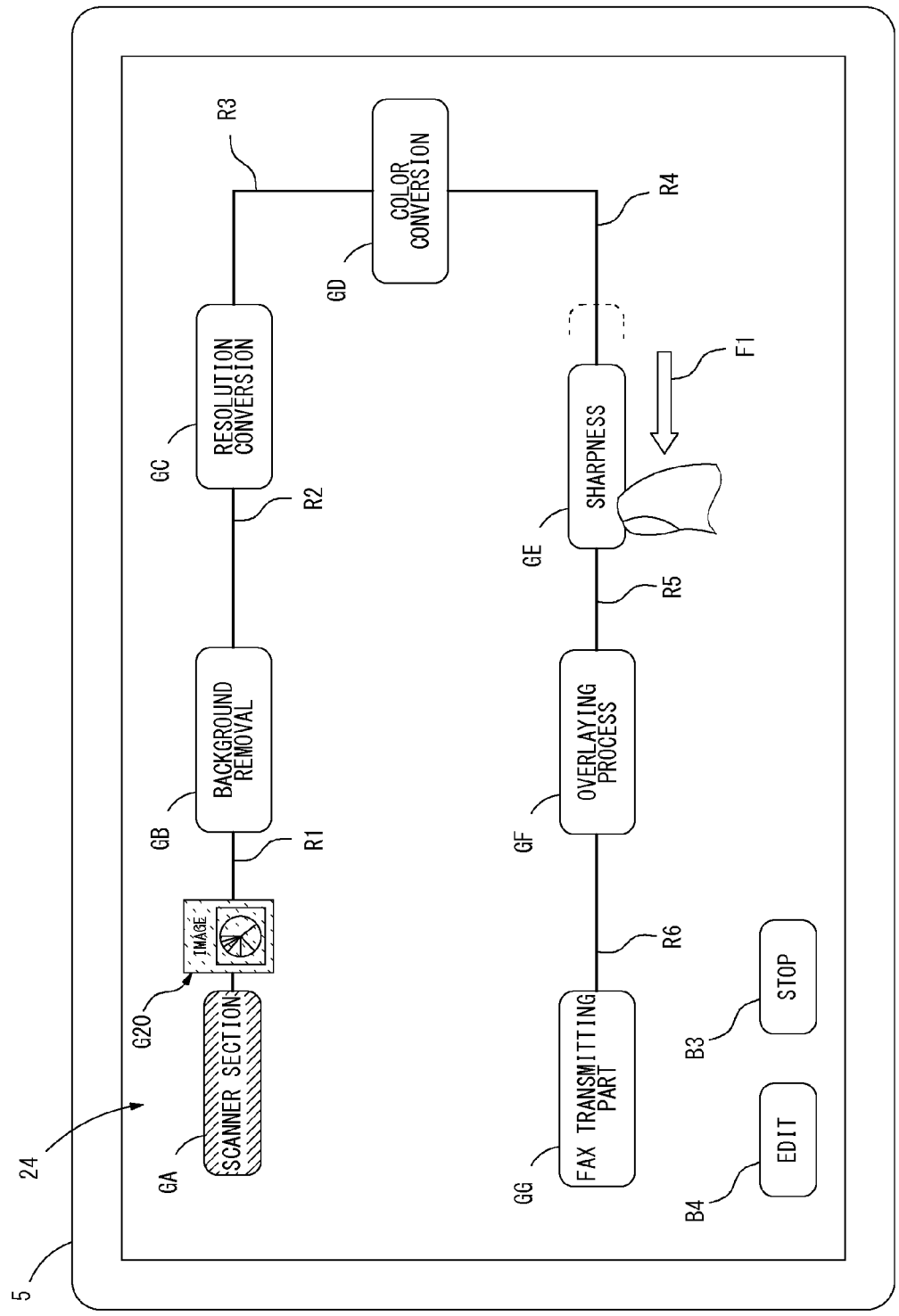
FIG. 7 shows an example of a user's operation to change a continuous displaying time of the thumbnail image.
Figure 8:
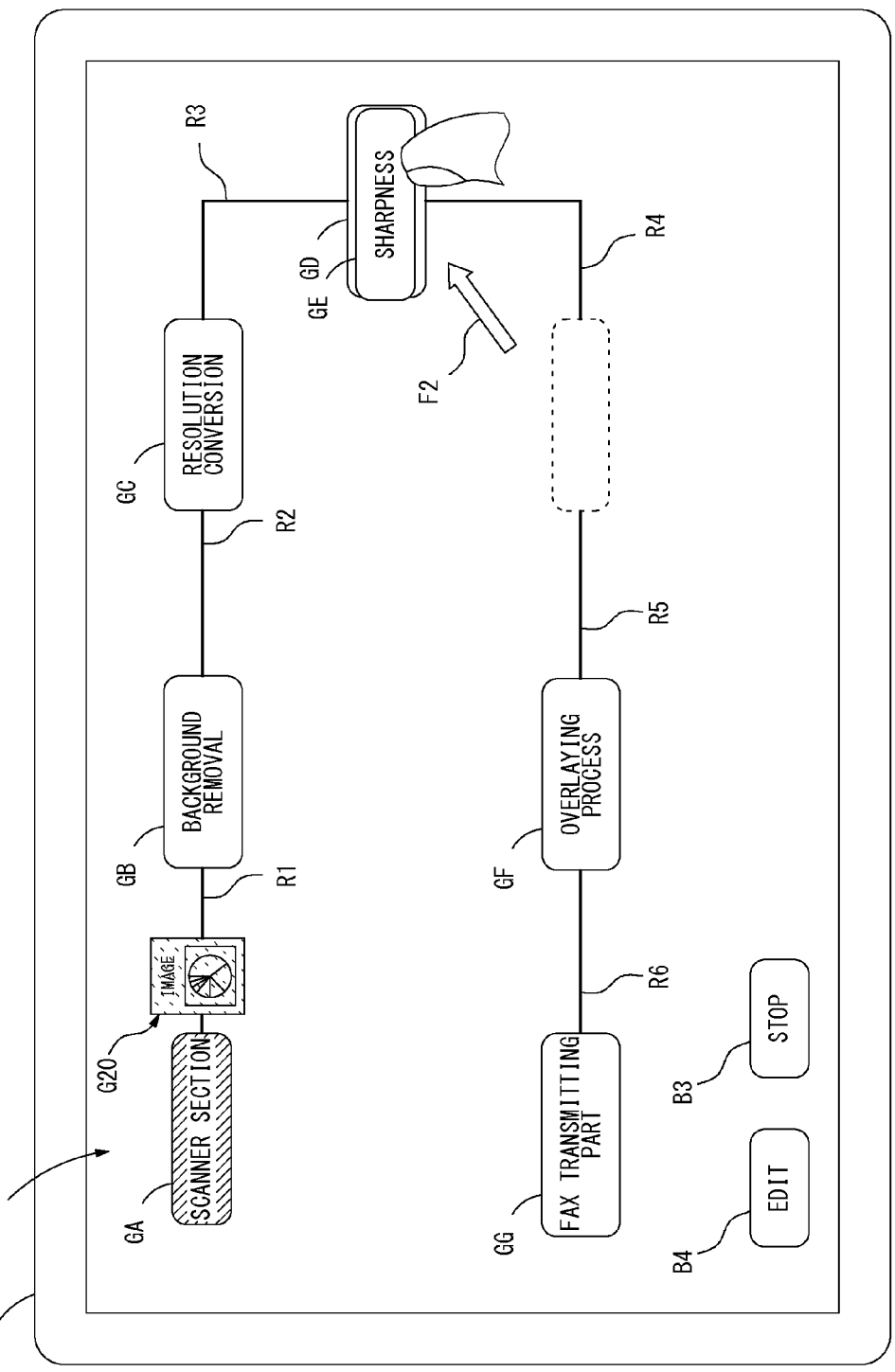
FIG. 8 shows an example of the user's operation to change the continuous displaying time of a thumbnail image.
Figure 9:
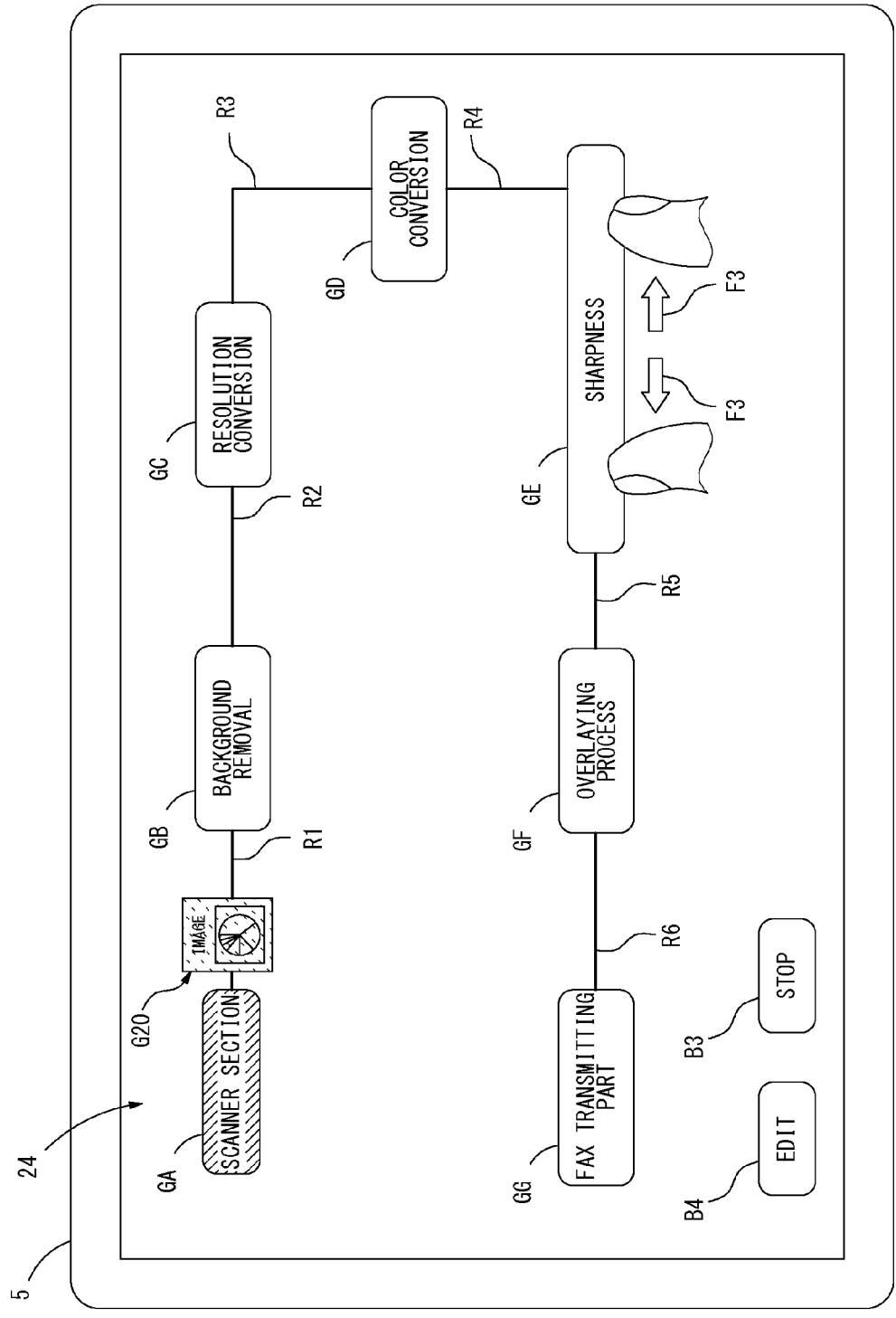
FIG. 9 shows an example of the user's operation to change the continuous displaying time of the thumbnail image.

FIGS. 7 to 9 show an example of the user's operation to change the continuous displaying time of each thumbnail image. FIG. 7 shows the example when the user drags the process icon GE corresponding to the sharpening part 44 to make the path line R4 longer and the path line R5 shorter by moving the process icon GE on the lower side of the processing path in a direction shown with an arrow F1. The time setting part 34 changes the value of the continuous displaying time of the thumbnail image to be displayed in each of the path lines R4 and R5 in accordance with the lengths of the path lines R4 and R5 changed based on the user's operation. More specifically, the continuous displaying time to display the thumbnail image corresponding to the image data G13 generated in response to the color conversion in the path line R4 becomes longer. On the other hand, the continuous displaying time to display the thumbnail image corresponding to the image data G14 generated in response to the sharpness in the path line R5 becomes shorter. When the user would like to have a longer time for checking the thumbnail image corresponding to the image data G13 generated in response to the color conversion in particular, he or she makes the operation to increase the length of the path line R4 as shown in FIG. 7. In order to increase the length of the path line R4, the user may make the operation to move the process icon GD corresponding to the color converting part 43 on the upper side of the processing path instead of the operation as illustrated in FIG. 7.

FIG. 8 shows the example when the user drags the process icon GE corresponding to the sharpening part 44 to superimpose the process icon GE on the process icon GD corresponding to the color converting part 43 by moving the process icon GD on the upper side of the processing path in a direction shown with an arrow F2. As described above, the time setting part 34 changes the value of the continuous displaying time of the thumbnail image to be displayed in each of the path lines R4 and R5 in accordance with the lengths of the path lines R4 and R5 changed based on the user's operation. In the example of FIG. 8, the process icon GE is superimposed on another process icon GD. So, the path line R4 is disappeared. The time setting part 34 sets the value of the continuous displaying time to display the thumbnail image corresponding to the image data G13 generated in response to the color conversion at 0, and sets the value of the continuous displaying time to display the thumbnail image corresponding to the image data G14 generated in response to the sharpness at twice the value of the previous value. As the path line R4 disappears, the thumbnail image corresponding to the image data G13 generated in response to the color conversion is not displayed any more. On the other hand, the thumbnail image corresponding to the image data G14 generated in response to the sharpness is displayed in the path line R5 to show that there is twice the continuous displaying time. Thus, when the user decides that it is not necessary to check the thumbnail image corresponding to the image data G13 generated in response to the color conversion, he or she is only required to make the operation to superimpose the process icon GE on another process icon GD as illustrated in FIG. 8.

FIG. 9 shows the example when the user makes the operation to set the process icon GE corresponding to the sharpening part 44 larger than the default size as shown with an arrow F3. In this case, the display size of the process icon GE becomes larger than that of other process icons. The time setting part 34 increases the value of the continuous displaying time of the thumbnail image to be displayed in the path line R5 in accordance with the display size of the process icon GE which is made larger, and decreases the values of the continuous displaying time of the thumbnail images to be displayed in other path lines. When the user would like to have a longer time for especially checking the thumbnail image corresponding to the image data G14 generated in response to the sharpness, he or she makes the operation to make the display size of the process icon GE corresponding to the sharpening part 44 larger as illustrated in FIG. 9. When, on the other hand, the user makes the operation to make the display size of the process icon GE smaller, the continuous displaying time of the thumbnail image corresponding to the image data G14 generated in response to the sharpness may be shortened.

The value of the continuous displaying time of each thumbnail image is appropriately changed based on the user's operation during execution of the job so that the continuous displaying time to display the thumbnail image the user desires to check in particular may become longer than the continuous displaying time to display other thumbnail images. Thus, the user is allowed to fully check the thumbnail image he or she desires.

Figure 10:
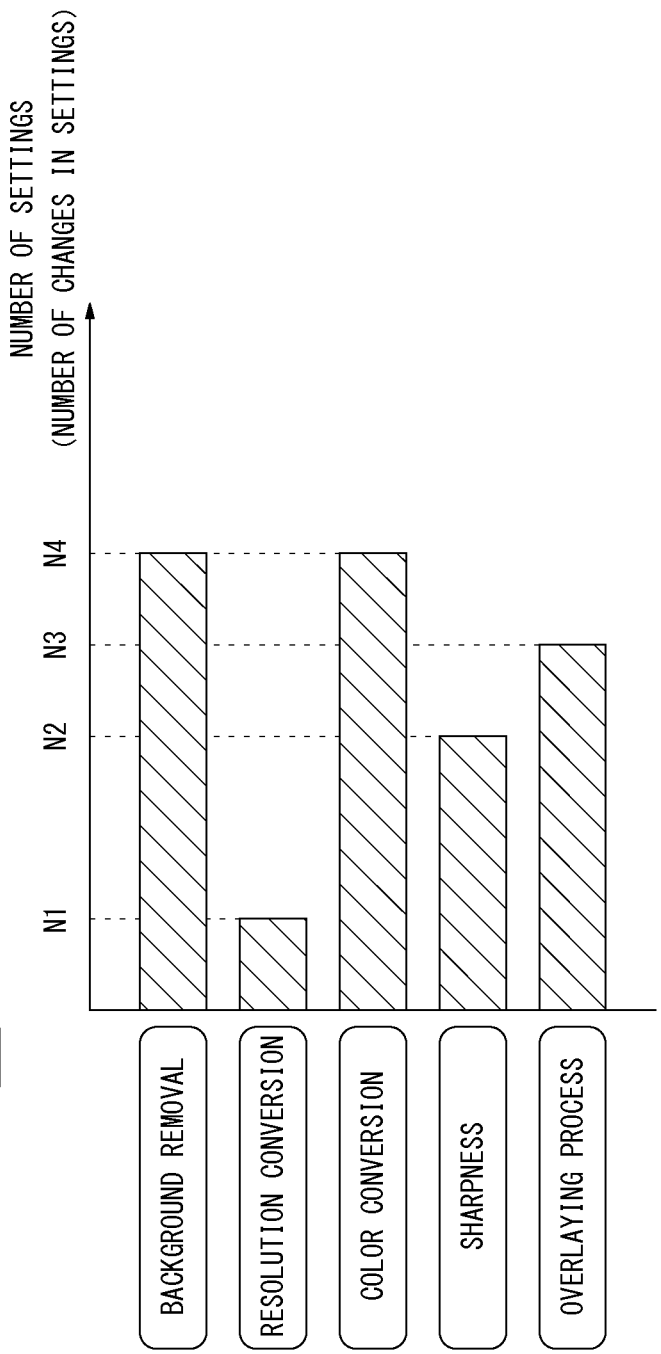
FIG. 10 shows an example of records information.

A case where the value of the continuous displaying time to display each thumbnail image is individually set in accordance with the records information 19 when the time setting part 34 sets the default value for the continuous displaying time of each thumbnail image. FIG. 10 shows an example of the records information 19 stored in the hard disk device 14. Information relating to the job executed in the past on the image processing device 1 is stored as the records information 19. To be more specific, the number of times that the image processing is performed (the number of settings) by each of the background removing part 41, the resolution converting part 42, the color converting part 43, the sharpening part 44 and the overlaying part 45 in response to the user's operation to make settings in advance in connection with the jobs executed in the past or the number of times that the settings on each of the background removing part 41, the resolution converting part 42, the color converting part 43, the sharpening part 44 and the overlaying part 45 is changed (the number of changes in the settings) during execution of the job is recorded as the records information 19 as shown in FIG. 10. Upon the start of execution of the job on the image processing device 1, the job controller 15 reads the aforementioned records information 19 if it is stored in the hard disk device 14 and sends the read records information 19 to the operational panel 5.

In response to obtaining the records information 19 from the job controller 15 at the start of execution of the job, the time setting part 34 individually sets the continuous displaying time to display each thumbnail image based on the number of settings or the number of changes in the settings on each of the background removing part 41, the resolution converting part 42, the color converting part 43, the sharpening part 44 and the overlaying part 45 that is recorded as the records information 19. More specifically, the larger the number of settings or the larger the number of changes in the settings, the process detail of the image processing set more or the settings of which is changed more is considered to be the process detail in which the user has more interest. The time setting part 34 then sets the default value for the continuous displaying time to display the thumbnail image showing the result of the image processing at a larger value, the larger the number of settings or the larger the number of changes. When the number of settings or the number of changes in the settings of the image processing is less than that of other image processing, the default value for the continuous displaying time to display the thumbnail image showing the result of the image processing is set at a smaller value than the values of the continuous displaying time to display other thumbnail images.

Figure 11:
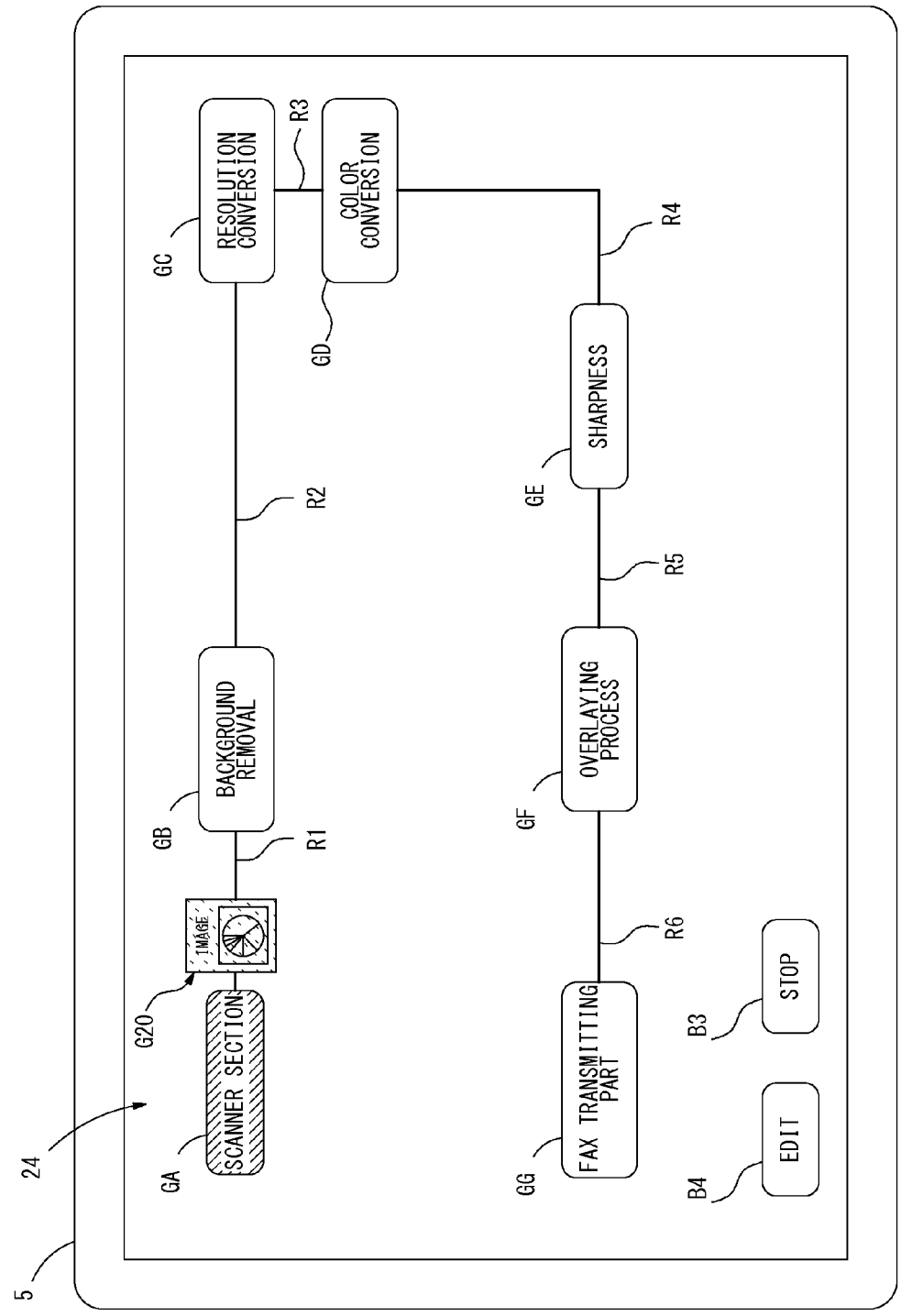
FIG. 11 shows an example of a processing path displayed on the viewing area of the operational panel in accordance with the records information.

FIG. 11 shows an example of the processing path displayed on the viewing area of the operational panel 5 in accordance with the records information 19 of FIG. 10. By referring to the records information 19 of FIG. 10, the numbers of settings or the numbers of changes in the settings on the background removing part 41 and the resolution converting part 42 are the largest. In the processing path displayed on the viewing area of the operational panel 5, the longest path line R2 showing the length of the continuous displaying time to display the thumbnail image corresponding to the image data generated in response to the background removal and the longest path line R4 showing the length of the continuous displaying time to display the thumbnail image corresponding to the image data generated in response to the color conversion are displayed. Upon the start of execution of the job on the image processing device 1, the processing path of FIG. 11 is displayed by default so that the thumbnail image in which the user is interested is displayed for a long time based on the operation made in the past. As a result, the user is allowed to easily check whether or not the image processing as intended is performed during execution of the job even without making any operation to make change in the continuous displaying time to display each thumbnail image.

Figure 12:
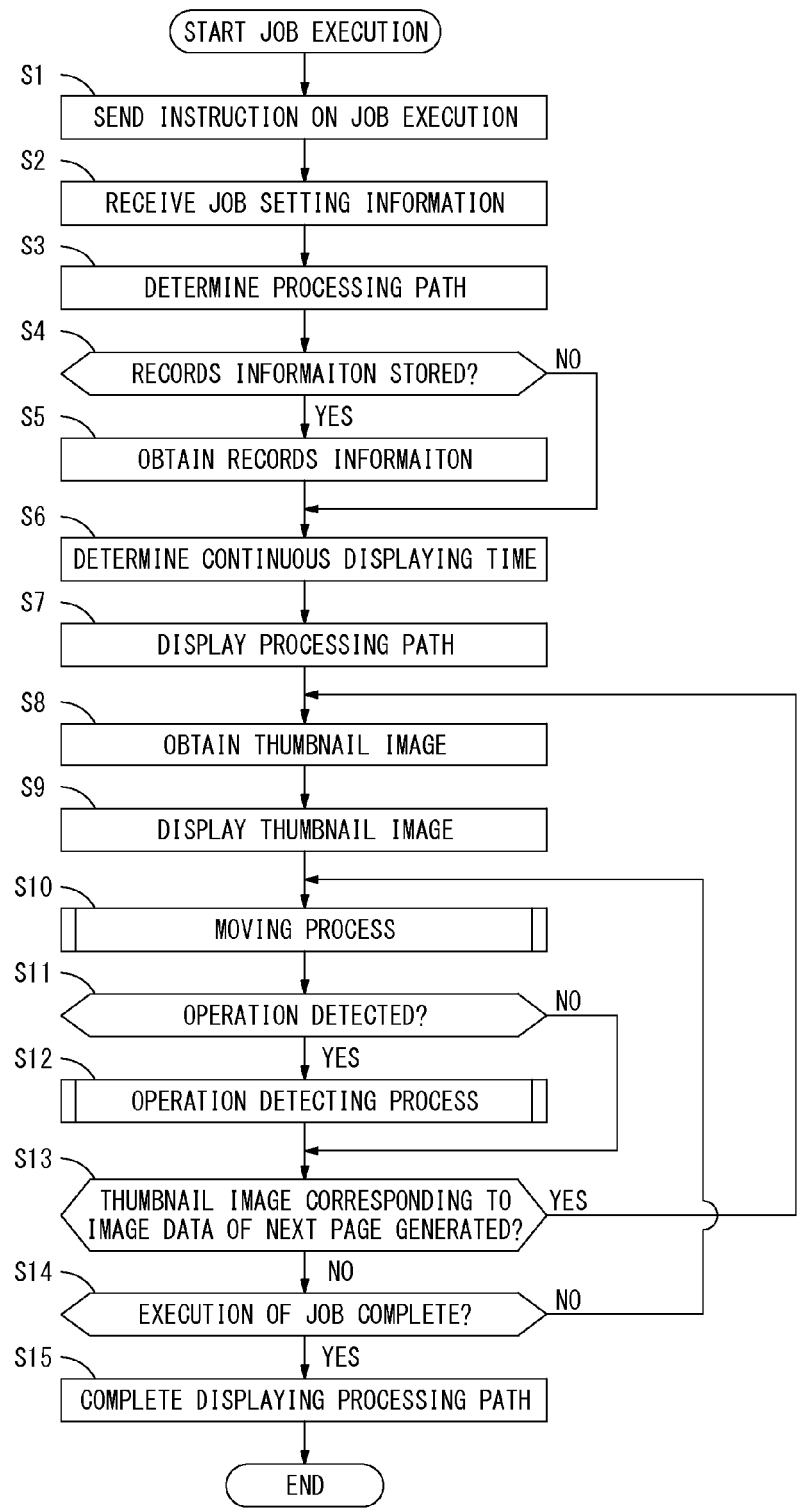
FIG. 12 is a flow diagram explaining an exemplary sequential procedure performed by the operational panel.
Figure 13:
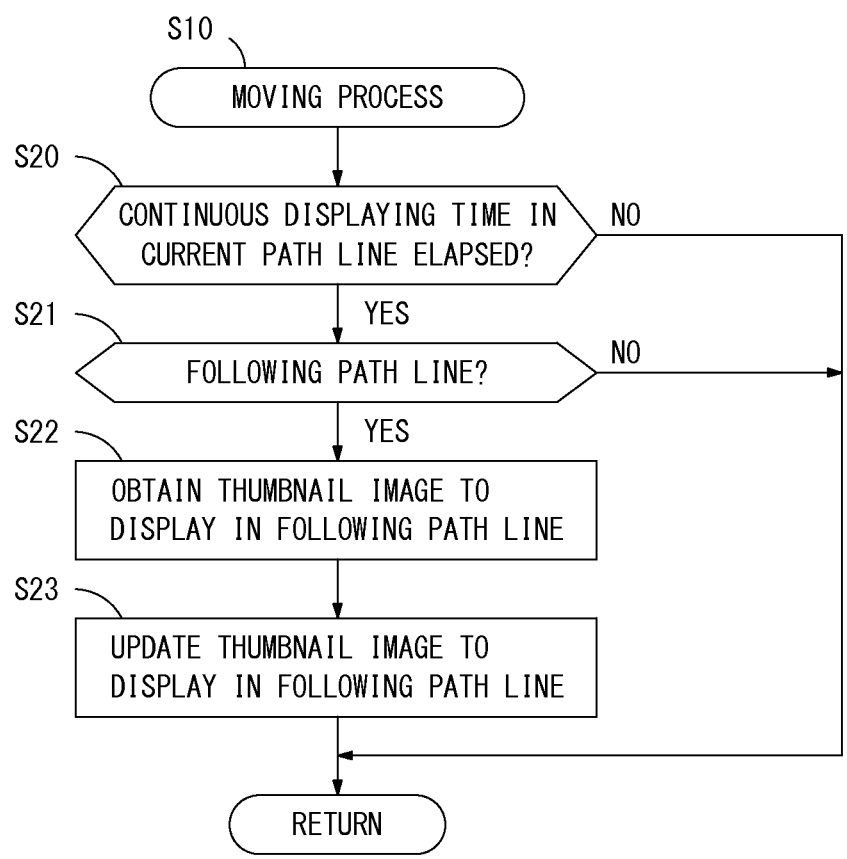
FIG. 13 is a flow diagram explaining the detailed exemplary sequential procedure of a moving process in a first preferred embodiment.
Figure 14:
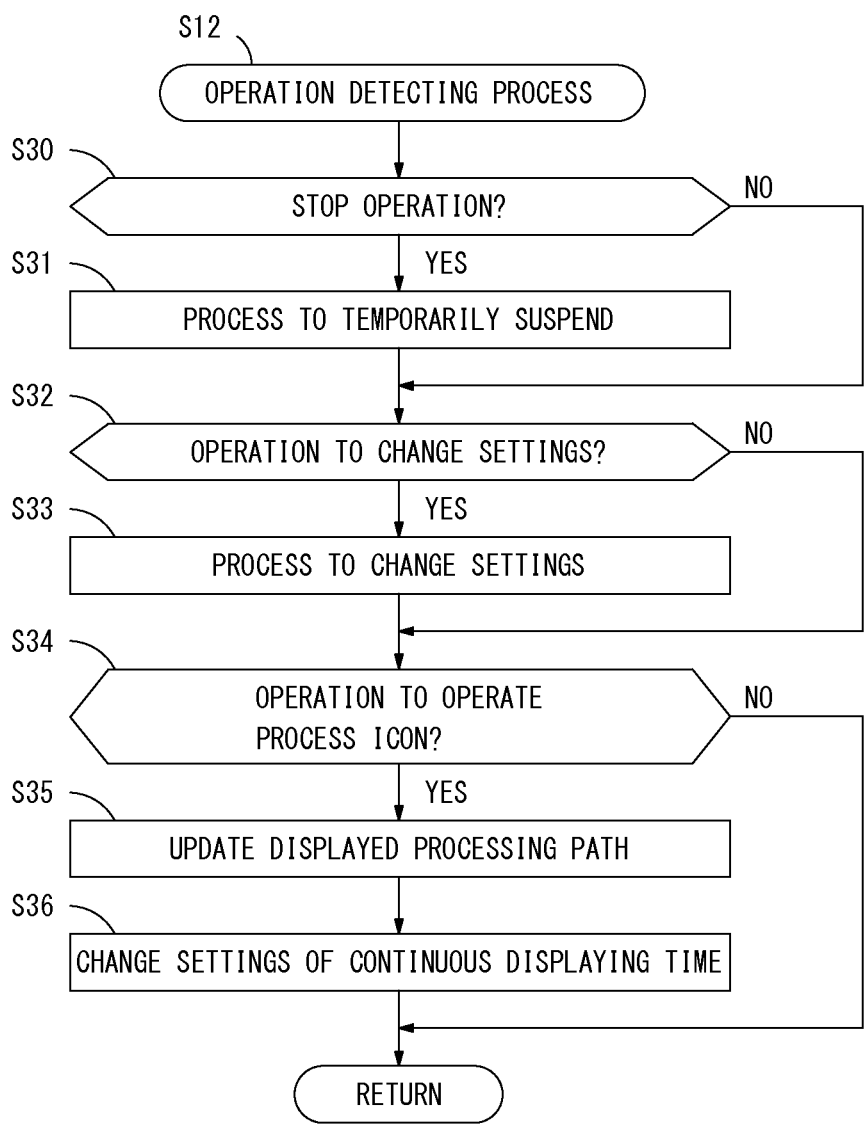
FIG. 14 is a flow diagram explaining the detailed exemplary sequential procedure of an operation detecting process.

The detailed sequential procedure on the operational panel 5 from the start to completion of execution of the job is described next. FIGS. 12 to 14 are flow diagrams explaining exemplary sequential procedures of the process performed on the operational panel 5. This process is performed upon execution of the aforementioned program 23 by the CPU 20 of the operational panel 5 in response to the instruction on execution of the job, for instance.

As shown in FIG. 12, in response to detecting the instruction on execution of the job given by the user, the operational panel 5 sends the instruction on execution of the job to the job controller 15 (step S1), and receives setting information of the job from the job controller 15 (step S2). As obtaining the setting information of the job, the operational panel 5 determines the processing path of the series of the operations performed during execution of the job (step S3). The operational panel 5 then determines whether or not the records information 19 is contained in the information received from the job controller 15 (step S4). If the records information 19 is contained, the operational panel 5 obtains the contained records information 19 (step S5). The operational panel 5 sets the value of the continuous displaying time to display the thumbnail image in each path line (step S6). With the obtained records information 19, the operational panel 5 individually sets the value of the continuous displaying time to display each thumbnail image based on the number of settings or the number of changes in the settings recorded as the records information 19. If the records information 19 is not obtained, the operational panel 5 sets the value of the continuous displaying time to display each thumbnail image by equally dividing the length of the predetermined period of time T, for example. The value of the continuous displaying time set in step S6 becomes the default value for displaying the thumbnail image. The operational panel 5 determines the length of each path line with the value of the continuous displaying time set in step S6, and displays the processing path on the viewing area of the display unit 24 (step S7).

The operational panel 5 obtains the thumbnail image from the job controller 15 (step S8). In step S8, the operational panel 5 obtains all the multiple thumbnail images generated in response to the respective image processing at once, for example. The operational panel 5 extracts the first thumbnail image among from the multiple thumbnail images, and displays the extracted first thumbnail image in the first path line R1 (step S9). The operational panel 5 starts measuring the continuous displaying time to display the thumbnail image in the path line R1. The operational panel 5 starts a moving process (step S10) to move the thumbnail image displayed in the processing path.

FIG. 13 is a flow diagram explaining the detailed exemplary sequential procedure of the moving process (step S10). Upon start of the process, the operational panel 5 determines whether or not the continuous displaying time to display the thumbnail image in the current path line has elapsed (step S20). When the continuous displaying time to display the thumbnail image has not elapsed (when a result of step S20 is NO), the operational panel 5 completes the moving process (step S10) without carrying out the following process. When the continuous displaying time to display the thumbnail image has elapsed (when a result of step S20 is YES), the operational panel 5 determines if there is the following path line in the processing path (step S21). If there is no following path line in the processing path (when a result of step S21 is NO), the operational panel 5 completes the moving process (step S10) without carrying out the following process. With the following path line in the processing path (when a result of step S21 is YES), the operational panel 5 obtains the thumbnail image to display in the following path line (step S22), and displays the obtained thumbnail image in the following path line (step S23). Together with that, the operational panel 5 starts measuring the continuous displaying time to display the thumbnail image in the path line. Thus, the moving process (step S10) is complete.

Referring back to FIG. 12, the operational panel 5 determines whether or not the user's operation is detected (step S11). If the user's operation is detected, the operational panel 5 performs an operation detecting process (step S12). In the operation detecting process, execution of the job is temporarily suspended, the settings of the image processing performed during execution of the job are changed or the value of the continuous displaying time to display the thumbnail image is changed.

FIG. 14 is a flow diagram explaining the detailed exemplary sequential procedure of the operation detecting process (step S12). Upon start of the process, the operational panel 5 determines whether or not the operation made by the user is the stop operation to temporarily suspend execution of the job (step S30). When the user's operation is the stop operation (when a result of step S30 is YES), the operational panel 5 sends the operation information to temporarily suspend execution of the job to the job controller 15 (step S31). When the user's operation is not the stop operation (when a result of step S30 is NO), the process in step S31 is not performed and skipped to step S32.

The operational panel 5 determines whether or not the user's operation is to change the settings of the image processing performed during execution of the job (step S32). When the operation is to change the settings of the image processing (when a result of step S32 is YES), the operational panel 5 sends the operation information to change the settings of the image processing to the job controller 15 (step S33). When the user's operation is not to change the settings of the image processing (when a result of step S32 is NO), the process in step S33 is not performed and skipped to step S34.

The operational panel 5 determines whether or not the user's operation is to operate the process icon (step S34). When the user's operation is to operate the process icon (when a result of step S34 is YES), the operational panel 5 updates the displayed processing path based on the user's operation (step S35). The operational panel 5 changes the settings of the continuous displaying time to display the thumbnail image in each path line based on the display position and the display size of the process icon operated by the user (step S36). When the user's operation is not to operate the process icon (when a result of step S34 is NO), the process in steps S35 and S36 is not performed. Thus, the operation detecting process (step S12) is complete.

Referring back to FIG. 12, the operational panel 5 then determines if there is the thumbnail image corresponding to the image data of the next page (step S13). If there is the thumbnail image corresponding to the image data of the next page (when a result of step S13 is YES), the operational panel 5 returns to step S8 to repeatedly perform the above-explained process. As a result, the multiple thumbnail images each of which corresponds to the image data of the different page may be displayed all at once in the respective path lines in the processing path displayed on the viewing area of the display unit 24, for example.

If there is no thumbnail image corresponding to the image data of the next page (when a result of step S13 is NO), the operational panel 5 determines whether or not execution of the job on the image processing device 1 is complete (step S14). When execution of the job on the image processing device 1 is not complete (when a result of step S14 is NO), the operational panel 5 returns to step S10 to repeatedly perform the above-explained process. Thus, the operational panel 5 moves the thumbnail image one after the other to the following path line along the processing path during execution of the job. In response to user's operation on the operational panel 5, the processing based on the operation is performed. After execution of the job is complete (when a result of step S14 is YES), the operational panel 5 completes displaying the processing path (step S15). The operational panel 5 then displays a stand-by screen image waiting for execution of the job, and completes the process.

The above-described process is performed by the operational panel 5 so that how the image data changes in response to each image processing performed by the image processing unit 12 of the image processing device 1 during execution of the job may be displayed. The user intentionally operates the process icon with the processing path being displayed on the viewing area of the operational panel 5, thereby making change in the settings of the continuous displaying time of each thumbnail image.

Figure 15A:
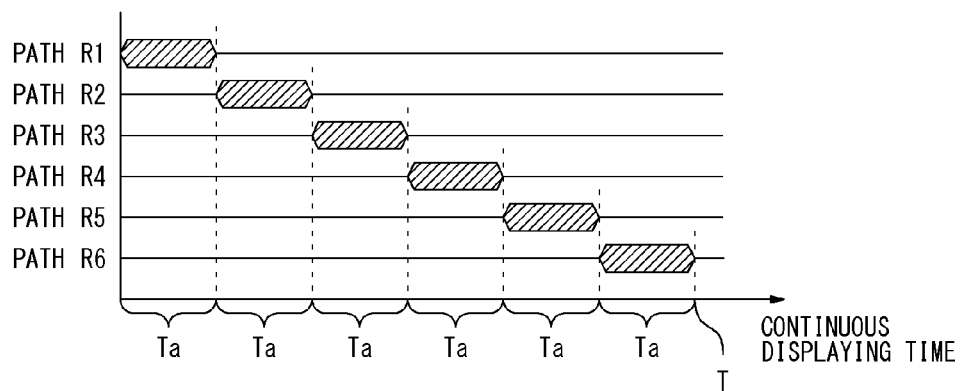
FIGS. 15A, 15B and 15C show an example of changes in the continuous displaying time of the thumbnail image displayed in each path line made in response to user's operation.
Figure 15B:
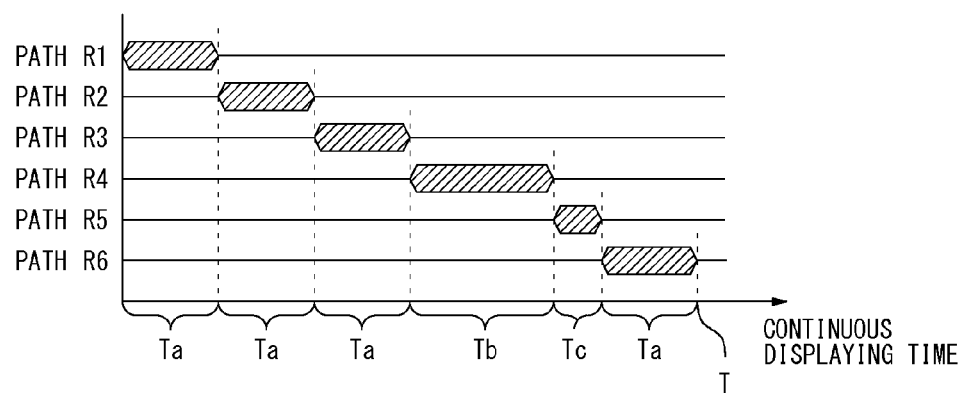
Figure 15C:
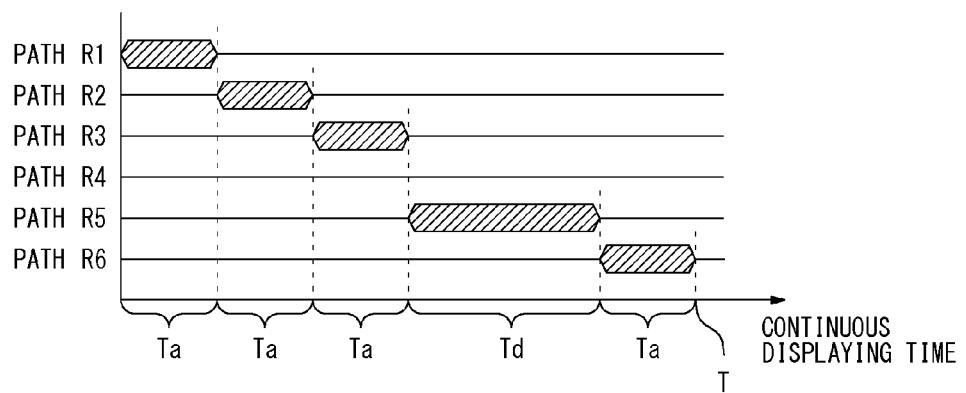

FIGS. 15A, 15B and 15C show an example of changes in the continuous displaying time of the thumbnail image displayed in each path line made in response to user's operation. FIG. 15A shows the continuous displaying time of the thumbnail image in each path line R1, R2, R3, R4, R5 and R6 while the processing path of FIG. 5 is being displayed on the viewing area of the display unit 24 (initial state). As shown in FIG. 5, for example, it is assumed that the time setting part 34 sets the value of the continuous displaying time to display the thumbnail image in each path line at almost equal value, time Ta. The value of the continuous displaying time to display each thumbnail image which is moved in each path line along the processing path during execution of the job is Ta as illustrated in FIG. 15A. In this case, the value of a total continuous displaying time T between the time when starting displaying the thumbnail image in the first path line R1 and the time when completing displaying the thumbnail image in the last path line R6 is to be six times the value of the continuous displaying time Ta.

FIG. 15B shows the continuous displaying time of the thumbnail image in each path line R1, R2, R3, R4, R5 and R6 when the user makes the operation to move the process icon GE on the lower side as shown in FIG. 7 with the screen image of FIG. 5 being displayed. When the user makes the operation as shown in FIG. 7, the length of the path line R4 is increased and that of the path line R5 is decreased. Thus, the value of the continuous displaying time to display the thumbnail image in the path line R4 is changed to Tb from Ta (however, Tb>Ta), and the value of the continuous displaying time to display the thumbnail image in the path line R5 is changed to Tc from Ta (however, Ta>Tc). In this case, there is no change in the value of the total continuous displaying time T.

FIG. 15C shows the continuous displaying time of the thumbnail image in each path line R1, R2, R3, R4, R5 and R6 when the user makes the operation to move the process icon GE on the upper side and superimpose the process icon GE on the process icon GD as shown in FIG. 8 with the screen image of FIG. 5 being displayed. When the user makes the operation as shown in FIG. 8, the path line R4 is disappeared. The value of the continuous displaying time to display the thumbnail image in the path line R4 is changed to 0 from Ta, and the value of the continuous displaying time to display the thumbnail image in the path line R5 is changed to Td from Ta (however, Td>Ta). In this case, there is also no change in the value of the total continuous displaying time T. If the user makes the operation to superimpose the multiple process icons on one another, he or she is allowed to specify the longer continuous displaying time to display one of the thumbnail images.

The user is allowed to freely adjust the continuous displaying time to display the thumbnail image he or she would like to check in particular. As a result, the time to fully check whether or not the processing as intended is performed for the image processing in which the user is interested in particular may be maintained.

(Second Preferred Embodiment)

A second preferred embodiment is described next. In the first preferred embodiment as described above, each processing part, the background removing part 41, the resolution converting part 42, the color converting part 43, the sharpening part 44 and the overlaying part 45, of the image processing unit 12 is formed from the hardware. Each aforementioned processing part of the image processing unit 12 of the second preferred embodiment is formed from the software. In the second preferred embodiment, the configuration of the image processing device 1 is the same as that of first preferred embodiment.

When each processing part, the background removing part 41, the resolution converting part 42, the color converting part 43, the sharpening part 44 and the overlaying part 45, of the image processing unit 12 is formed from the software, the image processing unit 12 generally performs each image processing at a slower speed than the process speed for the hardware. For performing each image processing on the software, all functions of a CPU are used for a single image processing. So, the image processing is started after the previous image processing is complete. In order to complete the entire image processing on the software, it may take few milliseconds to few seconds, for instance.

Figure 16:
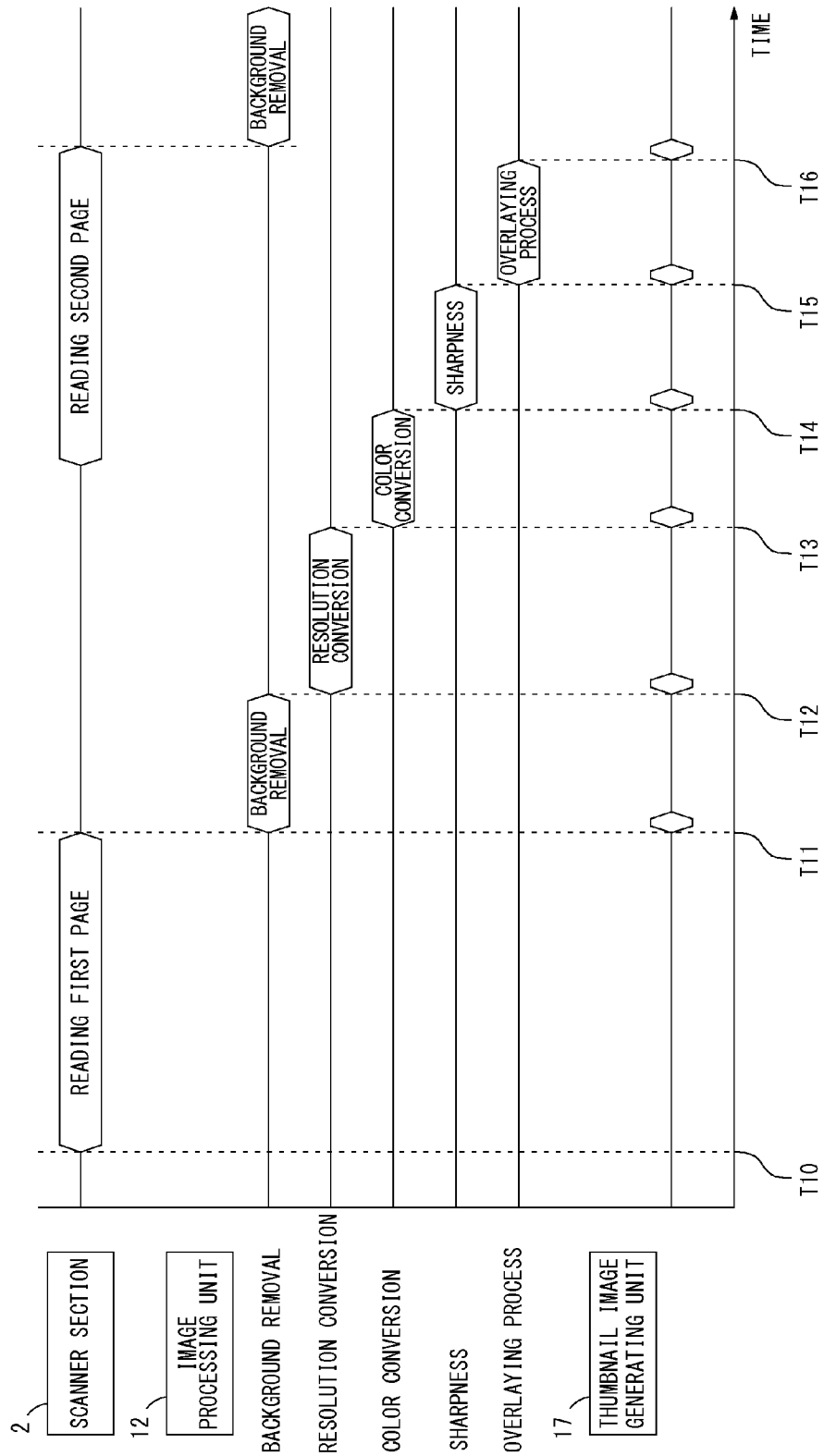
FIG. 16 is an exemplary timing chart showing an overview of a processing performed when each processing part of the image processing unit is formed from the software.

FIG. 16 is an exemplary timing chart showing an overview of a processing performed when each processing part of the image processing unit 12 is formed from the software. In the example of FIG. 16, for instance, the scanner section 2 is driven to read pages of the document including multiple pages one by one and generate the image data G10 corresponding to the image data of the single page to be the target of execution of the job. After the scanner section 2 starts reading the first page of the document at time T10, its reading head reads lines one by one along the main-scanning direction and stores the image data G10 corresponding to the image data of each line in the image memory 11 as described above.

Each processing part, 41, 42, 43, 44 and 45, of the image processing unit 12 may be formed from the software. In this case, each processing part, 41, 42, 43, 44 and 45 waits for the image data of the page to be stored in the image memory 11 to start the process. The background removing part 41 starts the background removal at time T11 when the scanner section 2 stores the image data G10 of the whole page in the image memory 11. The background removing part 41 completes the background removal at time T12. After that, the resolution converting part 42 reads the image data G11 generated in response to the background removal in the image memory 11, and starts the resolution conversion. As described above, the color converting part 43 starts the processing at time T13 when the resolution converting part 42 completes its processing, and the sharpening part 44 starts the processing at time T14 when the color converting part 43 completes its processing. The overlaying part 45 starts the processing at time T15 when the sharpening part 44 completes its processing, and completes its processing at time T16.

The image processing unit 12 formed from the software performs each image processing sequentially. So, the time required for each image processing is not the same, and it depends on the load on the software performing each image processing. The longer process time is required compared to the hardware.

The thumbnail image generating unit 17 is capable of generating the thumbnail image every time the image data corresponding to the image data of the single page is stored in the image memory 11. The thumbnail image generating unit 17, therefore, is capable of generating the thumbnail image every time the reading operation of the document by the scanner section 2 or each image processing on the image processing unit 12 is complete. The thumbnail image may be displayed in the processing path on the viewing area of the operational panel 5 at the time when the scanner section 2 obtains the image data. G10 to be the target of execution of the job and the thumbnail image corresponding to the image data G10 is generated. Even when the thumbnail image is displayed in the processing path at the time when the thumbnail image corresponding to the image data G10 is generated, the following thumbnail image has not been generated yet.

The thumbnail image displayed in the processing path may be updated sequentially and moved with the sequential procedure the same as the one explained in FIG. 12. In this case, it is required to check whether or not the following thumbnail image has already been generated at the update of the thumbnail image to the next one after the continuous displaying time of the thumbnail image displayed in the processing path has elapsed.

Figure 17:
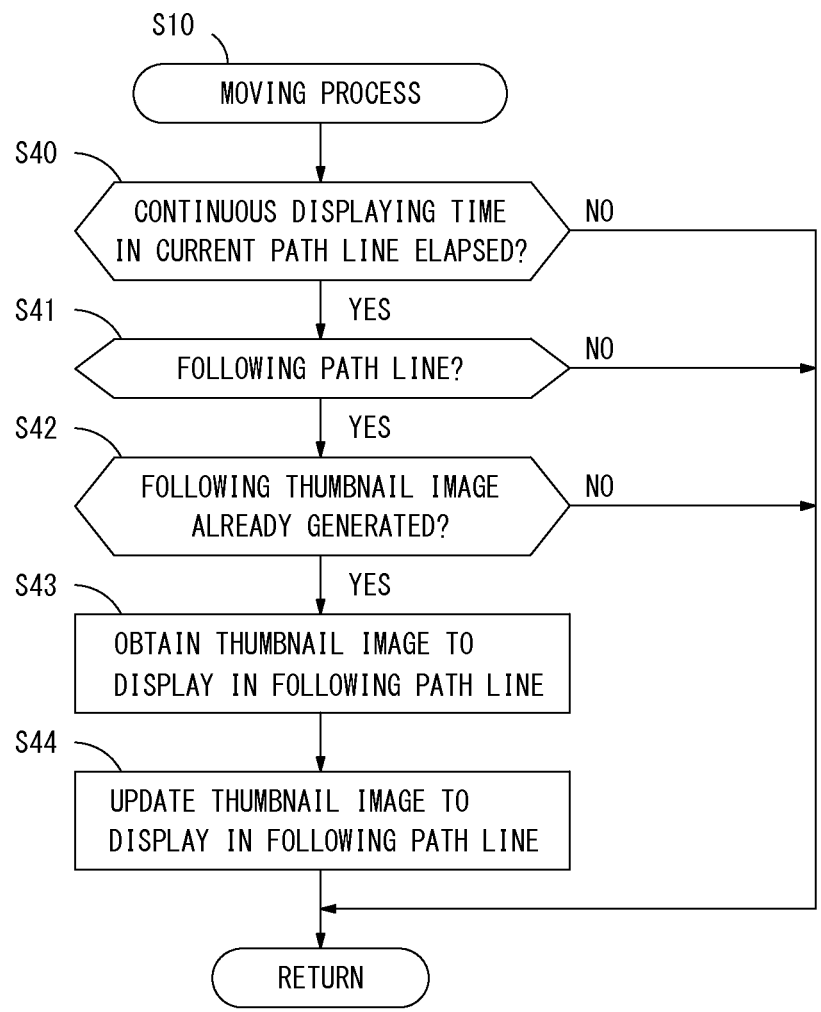
FIG. 17 is a flow diagram explaining the detailed exemplary sequential procedure of the moving process in a second preferred embodiment.

FIG. 17 is a flow diagram explaining the detailed exemplary sequential procedure of the moving process (step S10) when the sequential procedure the same as the one explained in FIG. 12 is used in the second preferred embodiment. Upon start of the process, as shown in FIG. 17, the operational panel 5 determines whether or not the continuous displaying time to display the thumbnail image in the current path line has elapsed (step S40). When the continuous displaying time to display the thumbnail image has not elapsed (when a result of step S40 is NO), the operational panel 5 completes the moving process (step S10) without carrying out the following process. When the continuous displaying time to display the thumbnail image has elapsed (when a result of step S40 is YES), the operational panel 5 determines if there is the following path line in the processing path (step S41). If there is no following path line in the processing path (when a result of step S41 is NO), the operational panel 5 completes the moving process (step S10) without carrying out the following process. With the following path line in the processing path (when a result of step S41 is YES), the operational panel 5 determines whether or not the following thumbnail image to display in the next path line has already been generated (step S42). When the following thumbnail image has not been generated yet (when a result of step S42 is NO), the operational panel 5 completes the moving process (step S10) without updating the thumbnail image, because, in this case, the current display state needs to be continued. When the following thumbnail image has already been generated (when a result of step S42 is YES), the operational panel 5 obtains the thumbnail image to display in the following path line (step S43), and displays the obtained thumbnail image in the following path line (step S44). Thus, the moving process (step S10) in the second preferred embodiment is complete.

The following thumbnail image, sometimes, has not been generated yet at the time when the continuous displaying time to display the thumbnail image set by the time setting part 34 by default has elapsed. According to the second preferred embodiment, the operational panel 5 waits until the following thumbnail image is generated, and updates the thumbnail image displayed in the processing path to the following thumbnail image at the time when the following thumbnail image is generated. When the time required for the image processing unit 12 to perform each image processing is longer than the continuous displaying time Ta set by the time setting part 34 by default, the thumbnail image moved in the processing path is updated in conjunction with the actual progress of the image processing on the image processing unit 12. When the time required for the image processing unit 12 to perform each image processing is shorter than the continuous displaying time Ta set by the time setting part 34 by default, the thumbnail image moved in the processing path is updated based on the continuous displaying time Ta set by the time setting part 34 by default as well as the hardware.

Figure 18:
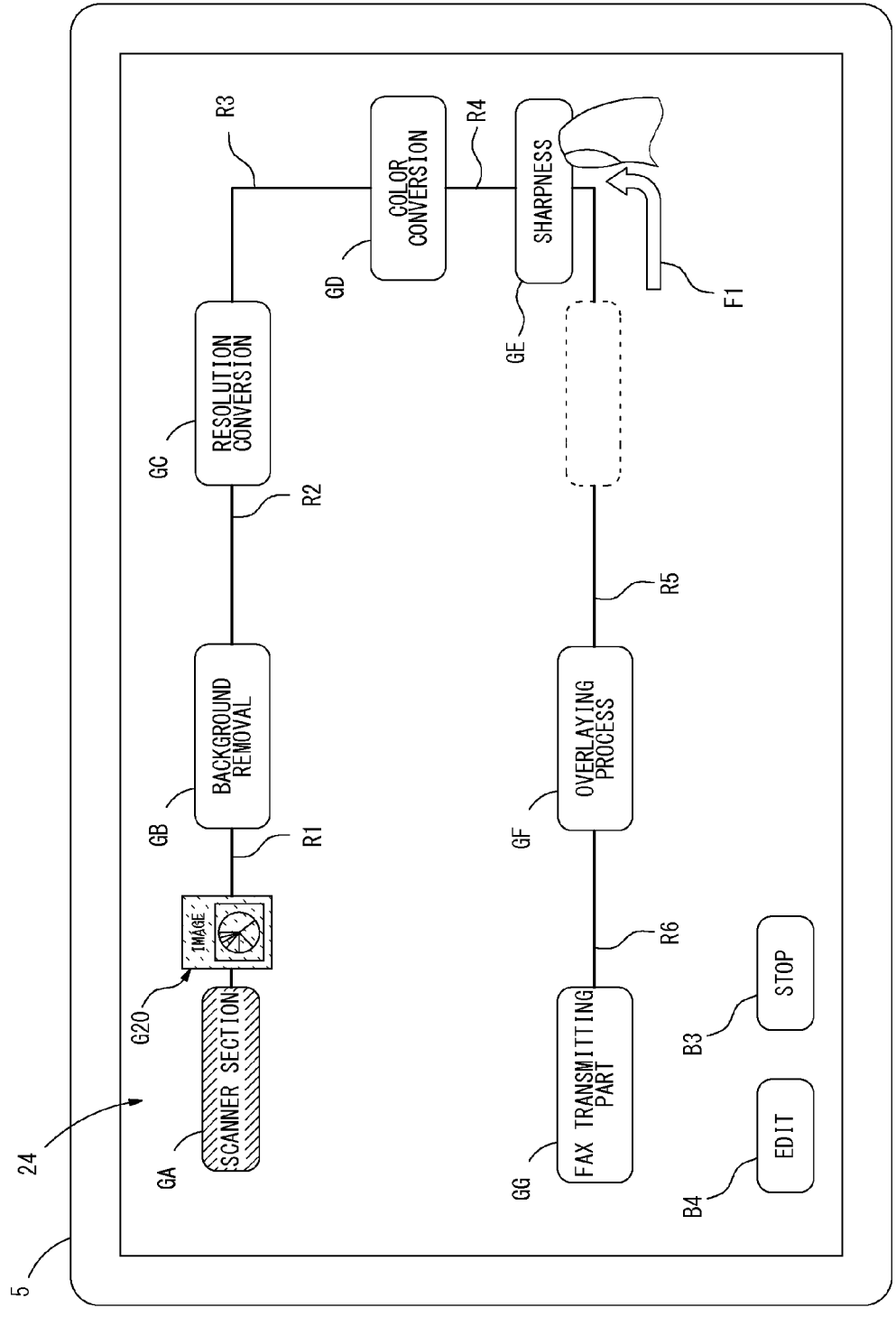
FIG. 18 is an example of a screen image displayed when the user makes the operation to move a process icon on the lower side.

As already described above, it takes time for the image processing unit 12 formed from the software to complete each image processing. Even when the user moves the process icon displayed in the processing path to make the particular path line shorter, he or she cannot make the continuous displaying time of the thumbnail image to be displayed in the shortened path line shorter than the time required for the image processing. As shown in FIG. 18, for instance, according to the first preferred embodiment, when the user makes the operation to move the process icon GE on the lower side of the processing path, the length of the path line R4 is decreased and that of the path line R5 is increased. Thus, the value of the continuous displaying time to display the thumbnail image corresponding to the image data G13 generated in response to the color conversion becomes smaller in response to the reduction rate of the path line R4. Also, the value of the continuous displaying time to display the thumbnail image corresponding to the image data G14 generated in response to the sharpness becomes larger in response to elongation rate of the path line R5. In the second preferred embodiment, however, even when the user specifies to make the continuous displaying time to display the thumbnail image corresponding to the image data G13 generated in response to the color conversion shorter, the image processing by the sharpening part 44 is sometimes not complete in the shortened continuous displaying time. So, in the second preferred embodiment, when the user makes the operation as described in FIG. 18, only the value of the continuous displaying time to display the thumbnail image corresponding to the image data G14 generated in response to the sharpness should preferably made larger without making the value of the continuous displaying time to display the thumbnail image corresponding to the image data G13 generated in response to the color conversion smaller.

Figure 19A:
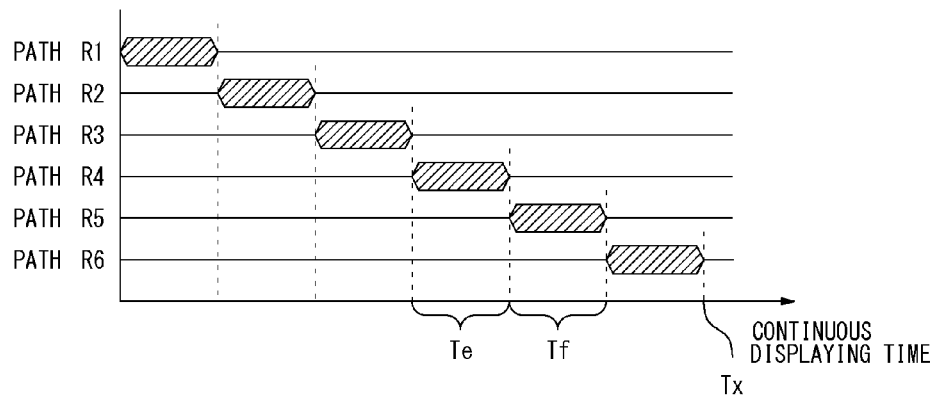
FIGS. 19A and 19B show an example of changes in the continuous displaying time of the thumbnail image displayed in each path line made in response to user's operation shown in FIG. 18.
Figure 19B:
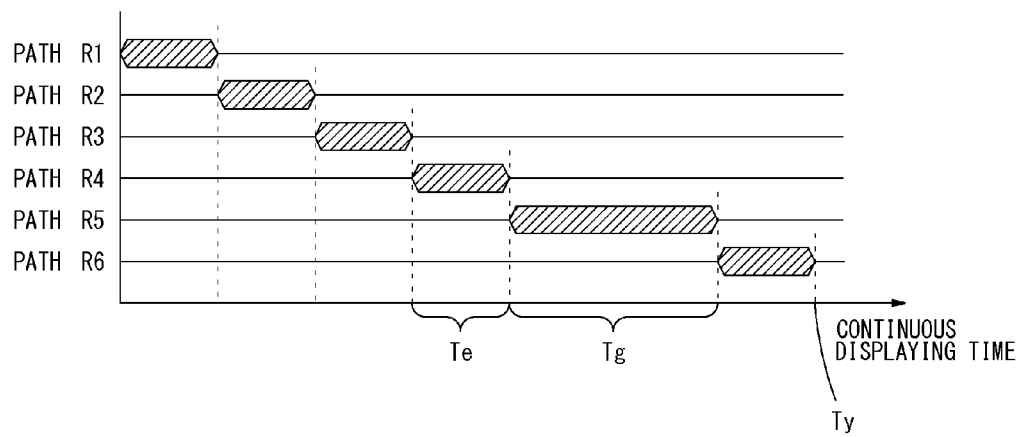

FIGS. 19A and 19B show an example of changes in the continuous displaying time of the thumbnail image displayed in each path line made in response to user's operation shown in FIG. 18. FIG. 19A shows the continuous displaying time before the user makes the operation, and FIG. 19B shows the continuous displaying time changed in response to the user's operation. The value of the continuous displaying time to display the thumbnail image in the path line R4 before the user makes the operation is Te as illustrated in FIG. 19A. In the continuous displaying time Te, the processing by the sharpening part 44 is performed. The value of the continuous displaying time to display the thumbnail image in the path line R5 before the user's operation is Tf. In response to the user's operation as shown in FIG. 18, the operational panel 5 changes the value Tf of the continuous displaying time to display the thumbnail image in the path line R5 to the value Tg of the continuous displaying time in accordance with the elongation rate of the path line R5 as illustrated in FIG. 19B. In this case, the value of a total continuous displaying time Tx between the time when starting displaying the thumbnail image in the first path line R1 and the tune when completing displaying the thumbnail image in the last path line R6 changes to the value of a total continuous displaying time Ty the amount of which is become larger because of the user's operation.

Even when the image processing unit 12 formed from the software performs each image processing, the larger value of the continuous displaying time to display the thumbnail image may be set in response to the user's operation. Thus, the user is allowed to freely set the continuous displaying time to display the thumbnail image he or she would like to check in particular as long as he or she wants also in the second preferred embodiment. As a result, the time to fully check whether or not the processing as intended is performed for the image processing especially the one of interest to the user of the plurality of image processing performed during execution of the job may be maintained.

The configurations and the way to display besides aforementioned ones are the same as those described in the first preferred embodiment.

As described above, how the image changes in response to the image processing performed during execution of the job may be displayed to the user to allow he or she to see the changes in the image, and the continuous displaying time to display each image may be set based on the user's will. As a result, the user is allowed to check the changes in the image he or she would like to see in particular in the enough continuous displaying time.

(Modifications)

While the preferred embodiments of the present invention have been described above, the present invention is not limited to the preferred embodiments. Various modifications may be applied to the present invention.

According to the above-explained preferred embodiments, for example, the image data to be the target of execution of the job is obtained by the scanner section 2 by reading the document and the image outputting unit 13 performs the fax transmission so that the job to output the image is executed. The image processing device 1, however, is capable of executing various types of jobs besides fax transmission jobs. The image processing device 1 is capable of displaying the processing path in the aforementioned way on the viewing area of the operational panel 5 in response to executing the jobs besides fax transmission jobs. For the jobs such as print jobs that don't take long to start image output on the image outputting unit 13 after the image inputting unit 10 inputs the image data, the image output is preferably waited until the moving process of the thumbnail image corresponding to the image data of all pages is complete by the operational panel 5.

As already described in the second preferred embodiment, it takes a long time for the image processing unit 12 formed from the software to complete each image processing. When the user makes the operation to change the settings of the image processing already carried out in the middle of execution of the job, the image processing unit 12 formed from the software needs to spend a long time to perform again the image processing after making change in the settings, resulting in significant reduction in operation efficiency. In order to avoid the reduction in operation efficiency, the entire processed image data generated in response to each image processing by the software is preferably stored in the image memory 11 at least until execution of the job is complete.

As a result, even when the user makes change in the settings of the image processing, the image processing may be restarted from the state in which the image processing before the image processing the settings of which is changed is complete, resulting in improvement in the operation efficiency.

In order to store the entire processed image data generated in response to each image processing by the software in the image memory 11, the image memory 11 should have high capacity. So, the cost of the image processing device 1 rises. The image memory 11 may store therein only the processed image data generated in response to the image processing which takes a predetermined period of time or longer to get its processing done, for example, of the plurality of image processing performed by the image processing unit 12 to meet the higher cost. As described above, when the settings of the image processing the one after the image processing, the processed image data generated in response to which is stored, is changed, the processing may be restarted with the processed image data stored in the image memory 11. Thus, the image processing requiring the predetermined period of time or longer to be done is not necessary to be performed again. Also in this case, the operation efficiency may be improved.

What is claimed is:

1. An image processing device, comprising:
   a display part on which a variety of information is displayed;
   a manipulation detecting part for detecting an operation on said display part;
   an image inputting part for inputting image data;
   an image processing part for performing a plurality of image processing sequentially to process the image data input by said image inputting part;
   a thumbnail image generating part for generating a thumbnail image one after the other based on the image data input by said image inputting part or the processed image data generated sequentially in response to each image processing performed by said image processing part;
   an image outputting part for outputting an image based on the image data which is processed through the entire plurality of image processing by said image processing part;
   a display controlling part for displaying a processing path of the plurality of image processing performed sequentially by said image processing part from the image data is input by said image inputting part until the image is output by said image outputting part on said display part, and for displaying the thumbnail image generated one after the other by said thumbnail image generating part with updating the thumbnail image along said processing path, thereby displaying a process result of each image processing performed by said image processing part; and
   a continuous displaying time setting part for setting a value of a continuous displaying time between updates of each thumbnail image displayed in said processing path by said display controlling part based on the operation detected by said manipulation detecting part or past operation records, wherein
   said display controlling part updates the thumbnail image in accordance with the value of the continuous displaying time set by said continuous displaying time setting part.

2. The image processing device according to claim 1, further comprising:
   a controlling part for setting each image processing or changing the settings of each image processing performed by said image processing part based on the operation detected by said manipulation detecting part, wherein
   said image processing part performs each of the plurality of image processing sequentially in accordance with the settings or changes in the settings configured by said controlling part.

3. The image processing device according to claim 2, further comprising:
   an image storage part for storing the processed image data generated in response to each image processing performed by said image processing part, wherein
   said image processing part, when the settings of a part of the plurality of image processing is changed by said controlling part, reads the processed image data generated in response to the image processing the one before the image processing, the settings of which is changed, in said storage part and performs the image processing sequentially from the image processing, the settings of which is changed by said controlling part.

4. The image processing device according to claim 2, further comprising:
   a records information storage part for storing the number of settings which is the number of times the image processing is set or the number of times that change is made in the settings configured by said controlling part as records information for each image processing executable on said image processing part, wherein
   said continuous displaying time setting part sets the value of the continuous displaying time between updates of each thumbnail image displayed in said processing path by said display controlling part in accordance with said number of settings or said number of changes in the settings recorded as said records information.

5. The image processing device according to claim 1, wherein
   said processing path includes multiple process icons each of which corresponds to the image processing performed by said image processing part, and
   said continuous displaying time setting part, when the operation to change a display interval of said respective multiple process icons included in said processing path is detected by said manipulation detecting part, sets the value of the continuous displaying time between updates of each thumbnail image in accordance with the changed display interval.

6. The image processing device according to claim 1, wherein
   said processing path includes said multiple process icons each of which corresponds to the image processing performed by said image processing part, and
   said continuous displaying time setting part, when the operation to superimpose one of said multiple process icons on another process icon is detected by said manipulation detecting part, sets not to display the thumbnail image showing the process result of the image processing corresponding to another process icon.

7. The image processing device according to claim 1, wherein
   said processing path includes said multiple process icons each of which corresponds to the image processing performed by said image processing part, and said continuous displaying time setting part, when the operation to change a size of one of said multiple process icons is detected by said manipulation detecting part, sets the value of the continuous displaying time to display the thumbnail image showing the process result of the image processing corresponding to the process icon based on the changed size.

8. The image processing device according to claim 1, wherein said display controlling part, when the following thumbnail image is not generated at the time of update of the thumbnail image in accordance with the value of the continuous displaying time set by said continuous displaying time setting part, updates the thumbnail image when the following thumbnail image has been generated by said thumbnail image generating part, thereby displaying the process result in conjunction with a progress of the image processing performed by said image processing part.

9. A display device capable of displaying in cooperation with an image processing device capable of performing a variety of image processing to process image data, wherein said image processing device includes:

an image inputting part for inputting the image data;

an image processing part for performing the plurality of image processing sequentially to process the image data input by said image inputting part;

a thumbnail image generating part for generating a thumbnail image one after the other based on the image data input by said image inputting part or the processed image data generated sequentially in response to each image processing performed by said image processing part;

an image outputting part for outputting an image based on the image data which is processed through the entire plurality of image processing by said image processing part; and a controlling part for setting each image processing performed by said image processing part, said display device includes:

a display part on which a variety of information is displayed;

a manipulation detecting part for detecting an operation on said display part;

a display controlling part for displaying a processing path of the plurality of image processing performed sequentially by said image processing part from the image data is input by said image inputting part until the image is output by said image outputting part on said display part, and for displaying the thumbnail image generated one after the other by said thumbnail image generating part with updating the thumbnail image along said processing path, thereby displaying a process result of each image processing performed by said image processing part; and a continuous displaying time setting part for setting a value of a continuous displaying time between updates of each thumbnail image displayed in said processing path by said display controlling part based on the operation detected by said manipulation detecting part or past operation records, and said display controlling part updates the thumbnail image in accordance with the value of the continuous displaying time set by said continuous displaying time setting part.

10. The display device according to claim 9, wherein said continuous displaying time setting part obtains the number of settings which is the number of times the image processing is set or the number of times that change is made in the settings configured by said controlling part from said image processing device for each image processing executable on said image processing part, and sets the value of the continuous displaying time between updates of each thumbnail image displayed in said processing path by said display controlling part in accordance with said number of settings or said number of changes in the settings.

11. The display device according to claim 9, wherein said processing path includes multiple process icons each of which corresponds to the image processing performed by said image processing part, and said continuous displaying time setting part, when the operation to change a display interval of said respective multiple process icons included in said processing path is detected by said manipulation detecting part, sets the value of the continuous displaying time between updates of each thumbnail image in accordance with the changed display interval.

12. The display device according to claim 9, wherein said processing path includes said multiple process icons each of which corresponds to the image processing performed by said image processing part, and said continuous displaying time setting part, when the operation to superimpose one of said multiple process icons on another process icon is detected by said manipulation detecting part, sets not to display the thumbnail image showing the process result of the image processing corresponding to another process icon.

13. The display device according to claim 9, wherein said processing path includes said multiple process icons each of which corresponds to the image processing performed by said image processing part, and said continuous displaying time setting part, when the operation to change a size of one of said multiple process icons is detected by said manipulation detecting part, sets the value of the continuous displaying time to display the thumbnail image showing the process result of the image processing corresponding to the process icon based on the changed size.

14. The display device according to claim 9, wherein said display controlling part, when the following thumbnail image is not generated at the time of update of the thumbnail image in accordance with the value of the continuous displaying time set by said continuous displaying time setting part, updates the thumbnail image when the following thumbnail image has been generated by said thumbnail image generating part, thereby displaying the process result in conjunction with a progress of the image processing performed by said image processing part.

15. A non-transitory computer readable recording medium on which a program is recorded, said program executable on a display device including a display part on which a variety of information is displayed and a manipulation detecting part for detecting an operation on said display part, said program being executed on said display device, thereby causing said display device to display in cooperation with an image processing device capable of performing a variety of image processing to process image data, wherein said image processing device includes:

an image inputting part for inputting the image data;

an image processing part for performing the plurality of image processing sequentially to process the image data input by said image inputting part;

a thumbnail image generating part for generating a thumbnail image one after the other based on the image data input by said image inputting part or the processed image data generated sequentially in response to each image processing performed by said image processing part;

an image outputting part for outputting an image based on the image data which is processed through the entire plurality of image processing by said image processing part; and a controlling part for setting each image processing performed by said image processing part, said program executed on said display device to function as a system comprises:

a display controlling part for displaying a processing path of the plurality of image processing performed sequentially by said image processing part from the image data is input by said image inputting part until the image is output by said image outputting part on said display part, and for displaying the thumbnail image generated one after the other by said thumbnail image generating part with updating the thumbnail image along said processing path, thereby displaying a process result of each image processing performed by said image processing part; and a continuous displaying time setting part for setting a value of a continuous displaying time between updates of each thumbnail image displayed in said processing path by said display controlling part based on the operation detected by said manipulation detecting part or past operation records, and said display controlling part updates the thumbnail image in accordance with the value of the continuous displaying time set by said continuous displaying time setting part.

16. The non-transitory computer readable recording medium according to claim 15, wherein said continuous displaying time setting part obtains the number of settings which is the number of times the image processing is set or the number of times that change is made in the settings configured by said controlling part from said image processing device for each image processing executable on said image processing part, and sets the value of the continuous displaying time between updates of each thumbnail image displayed in said processing path by said display controlling part in accordance with said number of settings or said number of changes in the settings.

17. The non-transitory computer readable recording medium according to claim 15, wherein said processing path includes multiple process icons each of which corresponds to the image processing performed by said image processing part, and said continuous displaying time setting part, when the operation to change a display interval of said respective multiple process icons included in said processing path is detected by said manipulation detecting part, sets the value of the continuous displaying time between updates of each thumbnail image in accordance with the changed display interval.

18. The non-transitory computer readable recording medium according to claim 15, wherein said processing path includes said multiple process icons each of which corresponds to the image processing performed by said image processing part, and said continuous displaying time setting part, when the operation to superimpose one of said multiple process icons on another process icon is detected by said manipulation detecting part, sets not to display the thumbnail image showing the process result of the image processing corresponding to another process icon.

19. The non-transitory computer readable recording medium according to claim 15, wherein said processing path includes said multiple process icons each of which corresponds to the image processing performed by said image processing part, and said continuous displaying time setting part, when the operation to change a size of one of said multiple process icons is detected by said manipulation detecting part, sets the value of the continuous displaying time to display the thumbnail image showing the process result of the image processing corresponding to the process icon based on the changed size.

20. The non-transitory computer readable recording medium according to claim 15, wherein said display controlling part, when the following thumbnail image is not generated at the time of update of the thumbnail image in accordance with the value of the continuous displaying time set by said continuous displaying time setting part, updates the thumbnail image when the following thumbnail image has been generated by said thumbnail image generating part, thereby displaying the process result in conjunction with a progress of the image processing performed by said image processing part.

* * * * *